US012696099B2

(12) United States Patent (10) Patent No.: US 12,696,099 B2
Wang et al. (45) Date of Patent: Jul. 28, 2026

(54) DATA TRANSMISSION METHOD AND RELATED APPARATUS

(71) Applicant: HUAWEI TECHNOLOGIES CO., LTD., Shenzhen (CN)

(72) Inventors: Jian Wang, Hangzhou (CN); Chen Xu, Hangzhou (CN); Gongzheng Zhang, Hangzhou (CN); Yunfei Qiao, Hangzhou (CN); Rong Li, Boulogne Billancourt (FR); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 308 days.

(21) Appl. No.: 18/514,066

(22) Filed: Nov. 20, 2023

(65) Prior Publication Data

US 2024/0089742 A1 Mar. 14, 2024

Related U.S. Application Data

(63) Continuation of application No. PCT/CN2022/094051, filed on May 20, 2022.

(30) Foreign Application Priority Data

May 27, 2021 (CN) .......................... 202110587562.0

(51) Int. Cl.
*H04W 16/18* (2009.01)
*H04W 72/50* (2023.01)

(52) U.S. Cl.
CPC ........... *H04W 16/18* (2013.01); *H04W 72/50* (2023.01)

(58) Field of Classification Search
CPC ..... H04W 16/18; H04W 72/50; H04W 28/06; G06N 3/0499; G06N 3/08; G06N 3/09; G06N 20/00; G06N 3/04; H04L 5/0053

(Continued)

(56) References Cited

U.S. PATENT DOCUMENTS

2024/0022297 A1* 1/2024 Farhadi .................. G06N 3/092
2024/0028961 A1* 1/2024 Ali ......................... H04L 41/145
2024/0107429 A1* 3/2024 Challita ................. G06N 3/096

FOREIGN PATENT DOCUMENTS

WO 2021089568 A1 5/2021

OTHER PUBLICATIONS

Amendments received before examination for EP 22810466 dated Apr. 2, 2025. (Year: 2025).*

(Continued)

*Primary Examiner* — Juan A Torres
(74) *Attorney, Agent, or Firm* — HAUPTMAN HAM, LLP

(57) ABSTRACT

A first machine learning model is deployed in a first communication apparatus, and a second machine learning model is deployed in a second communication apparatus. First information is obtained that carries indication information of both a first transmission resource and a second transmission resource, wherein the first transmission resource is for the first communication apparatus to transmit a first output of the first machine learning model to the second communication apparatus, and wherein the second transmission resource is for the first communication apparatus to receive first feedback data that is from the second communication apparatus. The first feedback data includes a first gradient, wherein the first gradient is for updating the first machine learning model. The first communication apparatus transmits the first output to the second communication apparatus on the first transmission resource.

20 Claims, 10 Drawing Sheets

(58) Field of Classification Search
   USPC ........................ 455/422.1, 456.1, 403, 550.1
   See application file for complete search history.

(56)                   References Cited

OTHER PUBLICATIONS

Amended claims filed after receipt of European search report for EP 22810466 dated Apr. 2, 2025. (Year: 2025).*

Cong Shen et al.: "Resource Rationing for Wireless Federated Learning: Concept, Benefits, and Challenges", IEEE Communications Magazine,May 5, 2021,XP11858334A, total 6 pages.

Otkrist Gupta et al.: "Distributed learning of deep neural network over multiple agents" arxiv:1810.06060v1, Oct. 14, 2018, total 21 pages.

Stefano Savazzi et al.:"A Joint Decentralized Federated Learning and Communications Framework for Industrial Networks", 2020 IEEE 25th International Workshop on Computer Aided Modeling and Design of CAMAD,Sep. 14, 2020,XP33833143A, total 7 pages.

Xinghan Wang et al.:"CFLMEC: Cooperative Federated Learning for Mobile Edge Computing",arxiv.org, Cornell University Library 201 Olin Library Cornell University,Feb. 21, 2021, XP081889776, total 10 pages.

International Search Report issued in corresponding International Application No. PCT/CN2022/094051, dated Jul. 27, 2022, pp. 1-11.

Extended European Search Report issued in corresponding European Application No. 22810466.7, dated Oct. 16, 2024.

* cited by examiner

DATA TRANSMISSION METHOD AND RELATED APPARATUS

CROSS-REFERENCE TO RELATED APPLICATIONS

This application is a continuation of International Application No. PCT/CN2022/094051, filed on May 20, 2022, which claims priority to Chinese Patent Application No. 202110587562.0, filed on May 27, 2021. The disclosures of the aforementioned applications are hereby incorporated by reference in their entireties.

BACKGROUND

Artificial intelligence (AI) technologies increasingly grow mature, and the AI technologies is applied to the communication field currently. A machine learning model is a common tool in the AI field, and the machine learning model includes: an input layer, an output layer, and at least one intermediate layer. Specifically, in the communication field, an input value of a transmitting side is used as the input layer, an output value of a receiving side is used as the output layer, and some machine learning models deployed at the transmitting side and the receiving side is used as the intermediate layer. The machine learning models respectively deployed at the transmitting side and the receiving side form an end-to-end machine learning model system.

For a general machine learning model, a forward inference result and a backpropagation gradient as intermediate data are directly transmitted between layers. In the communication field, between some layers of the end-to-end machine learning model system, the forward inference result and the backpropagation gradient need to be transmitted through a communication channel. The channel affects the transmission, and further affects training of the end-to-end machine learning model system. Because a channel status changes at any time, the corresponding machine learning model system also changes, and training of the machine learning models at the transmitting side and the receiving side is to be initiated at any time.

In the communication field, the training of the machine learning models requires intermediate data transmitted through exchange between the transmitting side and the receiving side, in other words, requires transmission resources respectively allocated to the transmitting side and the receiving side to transmit the intermediate data. The training of the machine learning model system is completed only after the intermediate data is to be exchanged for a plurality of times. Therefore, the transmission resources need to be allocated and scheduled for a plurality of times, and large signaling overheads are occupied for allocating and scheduling the transmission resources.

SUMMARY

Embodiments described herein provide a data transmission method and a related apparatus, to train, at low signaling overheads, machine learning models deployed at a transmitting side and a receiving side in an end-to-end communication system, and complete data transmission between the transmitting side and the receiving side in the communication system.

A first aspect of embodiments described herein provides a data transmission method. The method is applied to a first communication apparatus in a communication system, the communication system further includes a second communication apparatus, a first machine learning model is deployed in the first communication apparatus, a second machine learning model is deployed in the second communication apparatus, the first machine learning model and the second machine learning model are for implementing communication between the first communication apparatus and the second communication apparatus, and the method includes:

The first communication apparatus obtains first information, where the first information includes indication information of a first transmission resource and a second transmission resource. The first transmission resource is for transmitting a forward inference result, and the second transmission resource is for transmitting a reverse gradient. Specifically, the first transmission resource is for the first communication apparatus to send first data to the second communication apparatus, and the first data is a first output of the first machine learning model, namely, the forward inference result of the first machine learning model. The second transmission resource is for the first communication apparatus to receive first feedback data from the second communication apparatus, the first feedback data indicates a first gradient, the first gradient is the reverse gradient, and the first gradient is for updating the first machine learning model. The first communication apparatus sends the first data to the second communication apparatus on the first transmission resource.

To train the machine learning model system, the transmission resources for the forward inference result and the reverse gradient need to be determined, and transmission directions of the two pieces of data are opposite to each other. Control signaling indicates the transmission resource, and the existing control signaling indicates only the transmission resource in one direction. To train the machine learning model system, a transmitting side device (the first communication apparatus) or a receiving side device (the second communication apparatus) is to obtain a plurality of pieces of control signaling, to determine the transmission resources that are in the two directions and that are for transmitting the forward inference result and the reverse gradient. In at least one embodiment, transmission resource information in the two directions once is determined once by using the first information indicating both the first transmission resource and the second transmission resource. The first information is sent as control signaling, so that a quantity of pieces of control signaling in the communication system is reduced, thereby reducing overheads of the control signaling in the communication system.

In an optional implementation, second data is obtained after the first data is transmitted through a channel, and the second data is input into the second machine learning model, to obtain a second output. The first gradient is obtained by the second communication apparatus through calculation based on the second output.

In at least one embodiment, the first transmission resource is for transmitting the first output of the first machine learning model, namely, the forward inference result; and the second transmission resource is for transmitting the first gradient, namely, the reverse gradient. In this implementation, the first gradient is calculated based on the first output, in other words, the transmission resources indicated in the first information. The forward inference result and the reverse gradient that are transmitted by using the transmission resources are associated with each other. The machine learning model system is trained once by using the forward inference result and the reverse gradient that are associated with each other. In other words, the first information in at least one embodiment indicates all the transmission resources required for training the machine learning model system once.

In an optional implementation, the first information includes indication information of a transmission resource unit, and the first transmission resource and the second transmission resource are included in the transmission resource unit.

In at least one embodiment, the transmission resource unit includes: the first transmission resource for transmitting the forward inference result, and the second transmission resource for transmitting the reverse gradient. The first transmission resource and the second transmission resource that are included in the transmission resource unit are used to train the machine learning model system.

In an optional implementation, the first information is training control information TCI, and the TCI is the indication information of the transmission resource unit.

In at least one embodiment, the TCI is the indication information of the transmission resource unit. The transmission resources for the forward inference result and the reverse gradient is notified to the transmitting side device and/or the second communication apparatus through transmission of the TCI, so that the machine learning model system is trained.

In an optional implementation, the first information indicates a plurality of transmission resources for transmitting a plurality of forward inference results, or indicates a plurality of transmission resources for transmitting a plurality of reverse gradients. Specifically, in addition to the indication information of the first transmission resource and the second transmission resource, the first information further includes indication information of a third transmission resource and a fourth transmission resource, where the third transmission resource is for the first communication apparatus to send third data to the second communication apparatus, and the third data is a third output of the first machine learning model; and the fourth transmission resource is for the first communication apparatus to receive second feedback data from the second communication apparatus, the second feedback data indicates a second gradient, and the second gradient is for updating the first machine learning model. The first communication apparatus sends the third data to the second communication apparatus on the third transmission resource.

In at least one embodiment, the first information indicates a plurality of transmission resources (the first transmission resource and the third transmission resource) for transmitting the forward inference results, or indicates a plurality of transmission resources (the second transmission resource and the fourth transmission resource) for transmitting the reverse gradients. The first information is sent as control signaling, and the control signaling indicates a plurality of forward and reverse transmission resources, so that the machine learning network is trained for a plurality of times. Compared with a current technology in which a plurality of pieces of control signaling are needed to indicate the transmission resources required for the plurality of times of training, the method in at least one embodiment reduces the quantity of pieces of control signaling that is to be transmitted in the communication system, and reduces overheads of the control signaling in the communication system.

In an optional implementation, fourth data is obtained after the third data is transmitted through a channel, and the fourth data is input into the second machine learning model, to obtain a fourth output. The second gradient is obtained by the second communication apparatus through calculation based on the fourth output.

In at least one embodiment, the fourth transmission resource is for transmitting the second gradient, the second gradient is calculated based on the third output, and the third transmission resource is for transmitting the third output. Therefore, the third transmission resource and the fourth transmission resource is for transmitting the forward inference result and the reverse gradient that are associated with each other, to train the machine learning model once. From the foregoing that the first transmission resource and the second transmission resource is also used to train the machine learning model once. However, the forward inference result (the first output) and the reverse gradient (the first gradient) that are transmitted by using the first transmission resource and the second transmission resource are different from the forward inference result (the third output) and the reverse gradient (the second gradient) that are transmitted by using the third transmission resource and the fourth transmission resource. In other words, the transmission resources indicated by the first transmission resource and the second transmission resource are used to train the machine learning model system once, and the transmission resources indicated by the third transmission resource and the fourth transmission resource are used to train the machine learning model system for another time. Therefore, in at least one embodiment, one piece of first information is used to indicate all the transmission resources required for training the machine learning model system for a plurality of times, so that overheads of the control signaling are greatly reduced.

In an optional implementation, the first transmission resource is a forward transmission resource in a first round, and the second transmission resource is a reverse transmission resource in the first round; and the third transmission resource is a forward transmission resource in a second round, and the fourth transmission resource is a reverse transmission resource in the second round.

In an optional implementation, the first transmission resource and the second transmission resource are located at fixed transmission resource locations in at least one of time domain, frequency domain, space domain, code domain, or power domain.

In at least one embodiment, the transmission resources for the forward inference result and the reverse gradient being configured on the fixed transmission resources. In response to the fixed transmission resources being represented by using identifiers, the transmission resources in the two directions is represented by using a small amount of data, so that a data amount of the first information is reduced, thereby reducing overheads of the control signaling.

In an optional implementation, the first transmission resource and the second transmission resource are located at resource locations that are in at least one of time domain, frequency domain, space domain, code domain, or power domain and that are for transmitting service data.

In at least one embodiment, the transmission resources for the forward inference result and the reverse gradient are configured in resource blocks used for transmitting the service data, so that the machine learning model system is trained during transmission of the service data, thereby improving training flexibility. The transmission resources are flexibly configured in data blocks for transmitting the service data. Because data required for the training is transmitted without waiting for completion of the transmission of the service data, a time interval between the transmission resources required for the training is reduced, so that a latency of waiting for the transmission resources required for the training is reduced, and training efficiency of the machine learning model system is improved.

In an optional implementation, that the first communication apparatus obtains first information includes: The first communication apparatus receives the first information from the second communication apparatus. Alternatively, the first communication apparatus receives the first information from a third communication apparatus, where the third communication apparatus is configured to control the communication between the first communication apparatus and the second communication apparatus.

In an optional implementation, after that the first communication apparatus obtains first information, the method further includes: The first communication apparatus transmits the first information to the second communication apparatus.

In an optional implementation, the method further includes: inputting training data into the first machine learning model, to obtain the first output, namely, the forward inference result of the first machine learning model. The first communication apparatus sends the first output to the second communication apparatus on the first transmission resource. The first communication apparatus receives the first feedback data from the second communication apparatus on the second transmission resource, where the first feedback data indicates the first gradient, and the first gradient is the reverse gradient. The first communication apparatus updates the first machine learning model based on the first gradient.

In an optional implementation, before that the first communication apparatus obtains first information, the method further includes: The first communication apparatus receives a training indication from the second communication apparatus, where the training indication indicates to train the first machine learning model.

In at least one embodiment, in response to receiving the training indication from the second communication apparatus, the first communication apparatus starts a training process of the first machine learning model based on the training indication, for example, starts to calculate the first output. Compared with a manner in which after receiving the first information, the first communication apparatus starts to calculate the first output, a manner in which in response to receiving the first information, the first communication apparatus immediately sends the first output to the second communication apparatus on the first transmission resource improves training efficiency of the first machine learning model.

A second aspect of at least one embodiment provides a data transmission method. The method is applied to a second communication apparatus in a communication system, the communication system further includes a first communication apparatus, a first machine learning model is deployed in the first communication apparatus, a second machine learning model is deployed in the second communication apparatus, the first machine learning model and the second machine learning model are for implementing communication between the first communication apparatus and the second communication apparatus, and the method includes:

The second communication apparatus obtains first information, where the first information includes indication information of a first transmission resource and a second transmission resource. The first transmission resource is for transmitting a forward inference result, and the second transmission resource is for transmitting a reverse gradient. Specifically, the first transmission resource is for the second communication apparatus to receive second data from the first communication apparatus, the second data is data obtained after first data is transmitted through a channel, and the first data is a first output of the first machine learning model. The second transmission resource is for the second communication apparatus to send first feedback data to the first communication apparatus, the first feedback data indicates a first gradient, and the first gradient is for updating the first machine learning model. The second communication apparatus sends the first feedback data to the first communication apparatus on the second transmission resource.

For beneficial effects of the second aspect in at least one embodiment, refer to the first aspect. Details are not described herein again.

In an optional implementation, the second data is input into the second machine learning model, and a third gradient is obtained through calculation based on a second output. The third gradient is for updating the second machine learning model.

In an optional implementation, the second data is input into the second machine learning model, to obtain a second output. The first gradient is obtained by the second communication apparatus through calculation based on the second output.

In an optional implementation, the first information includes indication information of a transmission resource unit, and the first transmission resource and the second transmission resource are included in the transmission resource unit.

In an optional implementation, the first information is training control information TCI, and the TCI is the indication information of the transmission resource unit.

In an optional implementation, the first information indicates a plurality of transmission resources for transmitting a plurality of forward inference results, or indicates a plurality of transmission resources for transmitting a plurality of reverse gradients. Specifically, in addition to the indication information of the first transmission resource and the second transmission resource, the first information further includes indication information of a third transmission resource and a fourth transmission resource. The third transmission resource is for the second communication apparatus to receive fourth data from the first communication apparatus, the fourth data is data obtained after third data is transmitted through a channel, and the third data is a third output of the first machine learning model. The fourth transmission resource is for the second communication apparatus to send second feedback data to the first communication apparatus, the second feedback data indicates a second gradient, and the second gradient is for updating the first machine learning model. The second communication apparatus sends the second feedback data to the first communication apparatus on the fourth transmission resource.

In an optional implementation, the first transmission resource is a forward transmission resource in a first round, and the second transmission resource is a reverse transmission resource in the first round; and the third transmission resource is a forward transmission resource in a second round, and the fourth transmission resource is a reverse transmission resource in the second round.

In an optional implementation, the fourth data is input into the second machine learning model, and a fourth gradient is obtained through calculation based on the output. The fourth gradient is for updating the second machine learning model.

In an optional implementation, the fourth data is input into the second machine learning model, to obtain a fourth output. The second gradient is obtained by the second communication apparatus through calculation based on the fourth output, and the fourth gradient is also obtained by the second communication apparatus through calculation based on the fourth output.

In an optional implementation, the first transmission resource and the second transmission resource are located at fixed transmission resource locations in at least one of time domain, frequency domain, space domain, code domain, or power domain.

In an optional implementation, the first transmission resource and the second transmission resource are located at resource locations that are in at least one of time domain, frequency domain, space domain, code domain, or power domain and that are for transmitting service data.

In at least one embodiment, the second communication apparatus obtains first information includes: The second communication apparatus receives the first information from the first communication apparatus. Alternatively, the second communication apparatus receives the first information from a third communication apparatus, where the third communication apparatus is configured to control the communication between the first communication apparatus and the second communication apparatus.

In an optional implementation, after that the second communication apparatus obtains first information, the method further includes: The second communication apparatus sends the first information to the first communication apparatus.

In an optional implementation, the method further includes: The second communication apparatus receives second data from the first communication apparatus on the first transmission resource. The second communication apparatus inputs the second data into the second machine learning model, to obtain a second output, and the second communication apparatus obtains a first gradient through calculation based on the second output. The second communication apparatus sends first feedback data to the first communication apparatus on the second transmission resource, where the first feedback data is used to carry the first gradient, and the first gradient is for the first communication apparatus to update the first machine learning model.

In an optional implementation, before that the second communication apparatus obtains first information, the method further includes: transmitting a training indication to the first communication apparatus, where the training indication indicates to train the first machine learning model.

A third aspect of at least one embodiment provides a data transmission method. The method is applied to a third communication apparatus in a communication system, the communication system further includes a first communication apparatus and a second communication apparatus, the third communication apparatus is configured to control communication between the first communication apparatus and the second communication apparatus, a first machine learning model is deployed in the first communication apparatus, a second machine learning model is deployed in the second communication apparatus, the first machine learning model and the second machine learning model are for implementing the communication between the first communication apparatus and the second communication apparatus, and the method includes:

The third communication apparatus obtains first information, where the first information carries indication information of both a first transmission resource and a second transmission resource. The first transmission resource is for the first communication apparatus to send first data to the second communication apparatus, and the first data is a first output of the first machine learning model. The second transmission resource is for the second communication apparatus to send first feedback data to the first communication apparatus, the first feedback data indicates a first gradient, and the first gradient is for updating the first machine learning model.

The third communication apparatus sends the first information to the first communication apparatus and/or the second communication apparatus.

In at least one embodiment, as a central control device for the communication between the first communication apparatus and the second communication apparatus, the third communication apparatus transmits the first information to the first communication apparatus and/or the second communication apparatus, to notify the first communication apparatus and/or the second communication apparatus of the transmission resources for a forward inference result and a reverse gradient, to train a machine learning model system. Because the central control device is configured to control the communication between the first communication apparatus and the second communication apparatus, there is exchange between the central control device and the first communication apparatus and/or the second communication apparatus by using another control signaling. Content carried in the another control signaling is carried in the first message, so that a quantity of pieces of control signaling in the communication system is reduced, thereby reducing overheads of the control signaling in the communication system. In addition, as the central control device between the first communication apparatus and the second communication apparatus, the third communication apparatus learns of usage of all the transmission resources between the first communication apparatus and the second communication apparatus, and allocates the transmission resources more properly based on the usage (where, for example, an interval between the transmission resources is reduced to reduce a data transmission latency in training, or the transmission resources are flexibly configured in a middle of allocated resource blocks). For beneficial effects of the first information, refer to the first aspect in at least one embodiment. Details are not described herein again.

For beneficial effects of the third aspect in at least one embodiment, refer to the first aspect. Details are not described herein again.

In an optional implementation, second data is obtained after the first data is transmitted through a channel, and the second data is input into the second machine learning model, to obtain a second output. The first gradient is obtained by the second communication apparatus through calculation based on the second output.

In an optional implementation, the first information includes indication information of a transmission resource unit, and the first transmission resource and the second transmission resource are included in the transmission resource unit.

In an optional implementation, the first information is training control information TCI, and the TCI is the indication information of the transmission resource unit.

In an optional implementation, the first information indicates a plurality of transmission resources for transmitting a plurality of forward inference results, or indicates a plurality of transmission resources for transmitting a plurality of reverse gradients. Specifically, in addition to the indication information of the first transmission resource and the second transmission resource, the first information further includes indication information of a third transmission resource and a fourth transmission resource. The third transmission resource is for the first communication apparatus to send third data to the second communication apparatus, and the third data is a third output of the first machine learning model. The fourth transmission resource is for the second communication apparatus to send second feedback data to the first communication apparatus, the second feedback data indicates a second gradient, and the second gradient is for updating the first machine learning model. The first communication apparatus sends the third data to the second communication apparatus on the third transmission resource.

In an optional implementation, fourth data is obtained after the third data is transmitted through a channel, and the fourth data is input into the second machine learning model, to obtain a fourth output. The second gradient is obtained by the second communication apparatus through calculation based on the fourth output.

In an optional implementation, the first transmission resource and the second transmission resource are located at fixed transmission resource locations in at least one of time domain, frequency domain, space domain, code domain, or power domain.

In an optional implementation, the first transmission resource and the second transmission resource are located at resource locations that are in at least one of time domain, frequency domain, space domain, code domain, or power domain and that are for transmitting service data.

In an optional implementation, before that the third communication apparatus obtains first information, the method further includes: The third communication apparatus receives a training indication from the second communication apparatus, where the training indication indicates to train the first machine learning model and the second machine learning model.

A fourth aspect of at least one embodiment provides a communication apparatus. The communication apparatus is a first communication apparatus in a communication system, the communication system further includes a second communication apparatus, a first machine learning model is deployed in the first communication apparatus, a second machine learning model is deployed in the second communication apparatus, the first machine learning model and the second machine learning model are for implementing communication between the first communication apparatus and the second communication apparatus, and the first communication apparatus includes: a processing unit and a transceiver unit.

The processing unit is configured to obtain first information, where the first information includes indication information of a first transmission resource and a second transmission resource, where the first transmission resource is for sending first data to the second communication apparatus, and the first data is a first output of the first machine learning model; and the second transmission resource is for receiving first feedback data from the second communication apparatus, the first feedback data indicates a first gradient, and the first gradient is for updating the first machine learning model.

The transceiver unit is configured to send the first data to the second communication apparatus on the first transmission resource.

The first communication apparatus is configured to perform the method in the first aspect.

A fifth aspect of at least one embodiment provides a communication apparatus. The communication apparatus is a second communication apparatus in a communication system, the communication system further includes a first communication apparatus, a first machine learning model is deployed in the first communication apparatus, a second machine learning model is deployed in the second communication apparatus, the first machine learning model and the second machine learning model are for implementing communication between the first communication apparatus and the second communication apparatus, and the second communication apparatus includes: a processing unit and a transceiver unit.

The processing unit is configured to obtain first information, where the first information includes indication information of a first transmission resource and a second transmission resource, where the first transmission resource is for receiving second data from the first communication apparatus, the second data is data obtained after first data is transmitted through a channel, and the first data is a first output of the first machine learning model; and the second transmission resource is for sending first feedback data to the first communication apparatus, the first feedback data indicates a first gradient, and the first gradient is for updating the first machine learning model.

The transceiver unit is configured to send the first feedback data to the first communication apparatus on the second transmission resource.

The second communication apparatus is configured to implement the method in the second aspect.

A sixth aspect of at least one embodiment provides a communication apparatus. The communication apparatus is a third communication apparatus in a communication system, the communication system further includes a first communication apparatus and a second communication apparatus, the third communication apparatus is configured to control communication between the first communication apparatus and the second communication apparatus, a first machine learning model is deployed in the first communication apparatus, a second machine learning model is deployed in the second communication apparatus, the first machine learning model and the second machine learning model are for implementing the communication between the first communication apparatus and the second communication apparatus, and the third communication apparatus includes: a processing unit and a transceiver unit.

The processing unit is configured to obtain first information, where the first information includes indication information of a first transmission resource and a second transmission resource, where the first transmission resource is for the first communication apparatus to send first data to the second communication apparatus, and the first data is a first output of the first machine learning model; and the second transmission resource is for the second communication apparatus to send first feedback data to the first communication apparatus, the first feedback data indicates a first gradient, and the first gradient is for updating the first machine learning model.

The transceiver unit is configured to send the first information to the first communication apparatus and/or the second communication apparatus.

The third communication apparatus is configured to implement the method in the third aspect.

A seventh aspect of at least one embodiment provides a communication apparatus. The communication apparatus is a first communication apparatus in a communication system, the communication system further includes a second communication apparatus, a first machine learning model is deployed in the first communication apparatus, a second machine learning model is deployed in the second communication apparatus, the first machine learning model and the second machine learning model are for implementing communication between the first communication apparatus and the second communication apparatus, and the first communication apparatus includes: a processor and a transceiver.

The transceiver is configured to receive and send data or information.

The processor is configured to perform the data transmission method in the first aspect.

An eighth aspect of at least one embodiment provides a communication apparatus. The communication apparatus is a second communication apparatus in a communication system, the communication system further includes a first communication apparatus, a first machine learning model is deployed in the first communication apparatus, a second machine learning model is deployed in the second communication apparatus, the first machine learning model and the second machine learning model are for implementing communication between the first communication apparatus and the second communication apparatus, and the second communication apparatus includes: a processor and a transceiver.

The transceiver is configured to receive and send data or information.

The processor is configured to perform the data transmission method in the second aspect.

A ninth aspect of at least one embodiment provides a communication apparatus. The communication apparatus is a third communication apparatus in a communication system, the communication system further includes a first communication apparatus and a second communication apparatus, the third communication apparatus is configured to control communication between the first communication apparatus and the second communication apparatus, a first machine learning model is deployed in the first communication apparatus, a second machine learning model is deployed in the second communication apparatus, the first machine learning model and the second machine learning model are for implementing the communication between the first communication apparatus and the second communication apparatus, and the third communication apparatus includes: a processor and a transceiver.

The transceiver is configured to receive and send data or information.

The processor is configured to perform the data transmission method in the second aspect.

A tenth aspect of at least one embodiment provides a communication device, including: a processor, a memory, and a communication interface.

The memory is configured to store program instructions.

The processor is configured to execute the program instructions stored in the memory, to implement the method in any one of the first aspect to the third aspect.

The communication interface is configured to communicate with another device.

An eleventh aspect of at least one embodiment provides a communication device, including a processor, where the processor is coupled to a memory.

The memory is configured to store a program.

The processor is configured to execute the program in the memory, so that the processor performs the method in any one of the first aspect to the third aspect.

In at least one embodiment, the communication device further includes the memory.

Optionally, the memory is integrated with the processor. In at least one embodiment, the memory is located outside the communication device.

A twelfth aspect of at least one embodiment provides a computer-readable storage medium. The computer-readable storage medium stores a program, and in response to executing the program, a computer is enabled to perform the method in any one of the first aspect to the third aspect.

A thirteenth aspect of at least one embodiment provides a computer program product. In response to the computer program product running on a computer, the computer is enabled to perform the method in any one of the first aspect to the third aspect.

A fourteenth aspect of at least one embodiment provides a communication system. The communication system includes the first communication apparatus according to the fourth aspect and the second communication apparatus according to the fifth aspect.

In at least one embodiment, the communication system further includes the third communication apparatus according to the sixth aspect.

The communication system is configured to implement the data transmission method in any one of the first aspect to the third aspect.

DESCRIPTION OF EMBODIMENTS

The following describes at least one embodiment with reference to the accompanying drawings. A person of ordinary skill in the art learns that, with development of technologies and emergence of a new scenario, technical solutions provided in at least one embodiment are also applicable to a similar technical problem.

In the claims, and accompanying drawings, the terms "first", "second", and the like are intended to distinguish between similar objects but do not necessarily indicate a specific order or sequence. The terms used in such a way are interchangeable in proper circumstances, and this is merely a discrimination manner that is used in response to objects having a same attribute being described in at least one embodiment. In addition, the terms "include", "have" and any other variants mean to cover the non-exclusive inclusion, so that a process, method, system, product, or device that includes a series of units is not necessarily limited to those units, but includes other units not expressly listed or inherent to such a process, method, system, product, or device.

I. Application Scenario in at Least One Embodiment.

1. Communication System Architecture.

Figures 1A, 1B, 1C:
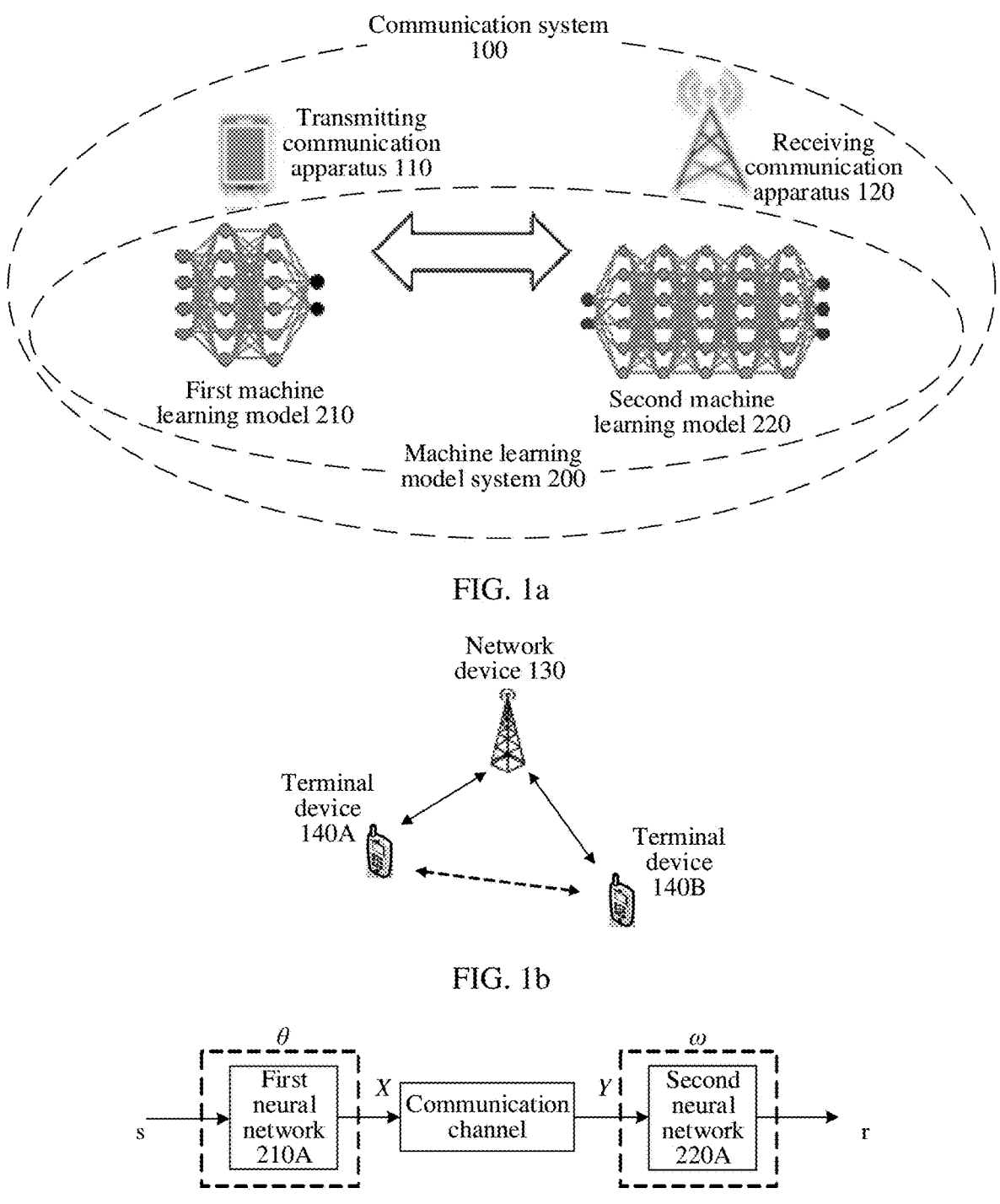
FIG. 1a is a schematic diagram of an application scenario of a data transmission method according to at least one embodiment.
FIG. 1B is a schematic diagram of a system architecture of a data transmission method according to at least one embodiment.
FIG. 1c is a schematic diagram of a neural network system according to at least one embodiment.

FIG. 1*a* is a schematic diagram of an application scenario of a data transmission method according to at least one embodiment. A communication system 100 shown in FIG. 1*a* includes a transmitting communication apparatus 110 and a receiving communication apparatus 120. A first machine learning model 210 is deployed on the transmitting communication apparatus 110, and a second machine learning model 220 is deployed on the receiving communication apparatus 120. The first machine learning model 210 and the second machine learning model 220 are for implementing communication between the transmitting communication apparatus 110 and the receiving communication apparatus 120.

Specifically, the transmitting communication apparatus 110 is a terminal device. In at least one embodiment, in addition to the terminal device, the transmitting communication apparatus 110 is alternatively another apparatus having a communication capability, for example, a base station. This is not limited herein.

Specifically, the receiving communication apparatus 120 is a base station. In at least one embodiment, in addition to the base station, the receiving communication apparatus 120 is alternatively another apparatus having a communication capability, for example, a terminal device. This is not limited herein.

Optionally, the communication system 100 in at least one embodiment further includes a central control device. The central control device is configured to control the communication between the transmitting communication apparatus 110 and the receiving communication apparatus 120.

Specifically, the central control device is a base station. In at least one embodiment, in addition to the base station, the central control device is another communication apparatus, for example, an edge device, provided that the another communication apparatus has a capability of controlling the communication between the transmitting communication apparatus and the receiving communication apparatus. This is not limited herein.

Specifically, the communication system in at least one embodiment is a wireless communication system such as a 5th generation (5G) mobile communication technology system, a satellite communication system, or a short-distance communication system. A system architecture is shown in FIG. 1B. The system architecture includes a network device 130. The network device 130 provides a communication service for a terminal device 140A and a terminal device 140B. In the wireless communication system, point-to-point communication is alternatively performed. For example, a plurality of terminal devices communicate with each other. In at least one embodiment, the network device 130 further provides the service for more or fewer terminal devices. A quantity of the terminal devices and types of the terminal devices are determined based on an actual requirement. This is not specifically limited herein.

The wireless communication system mentioned in at least one embodiment includes but is not limited to a narrowband internet of things (NB-IoT) system, a long term evolution (LTE) system, three application scenarios in a 5G mobile communication system: enhanced mobile broadband (enhanced mobile broadband, eMBB), ultra-reliable low-latency communication (URLLC), and massive machine-type communications (mMTC) in, and another mobile communication system that appears in the future. This is not limited herein.

In at least one embodiment, the network device 130 is an apparatus deployed in a radio access network and configured to provide a wireless communication function for the terminal device. The network device 130 provides the wireless communication function for a plurality of terminal devices, for example, the terminal device 140A and the terminal device 140B shown in FIG. 1B. The network device 130 includes a macro base station, a micro base station (also referred to as a small cell), a relay station, an access point, or the like in various forms. In systems that use different radio access technologies, names of a device that has a function of the network device 130 is different. For example, the device is referred to as an evolved NodeB (eNB or eNodeB) in the LTE system, or is referred to as a NodeB in a 3rd generation (3G) system. For ease of description, in at least one embodiment, the foregoing apparatuses that provide the wireless communication function for the terminal device are collectively referred to as a network device or a base station (BS).

The network device 130 in at least one embodiment is an evolved NodeB (eNB or eNodeB) in LTE; or is a base station in a 5G network, a broadband network service gateway (BNG), an aggregation switch, a non-3rd generation partnership project (3GPP) access device, or the like. This is not specifically limited in at least one embodiment. Optionally, the base station in at least one embodiment includes various forms of base stations, for example, a macro base station, a micro base station (also referred to as a small cell), a relay station, an access point, a next-generation base station (gNodeB, gNB), a transmission reception point (TRP), a transmission point (TP), a mobile switching center and a device that functions as a base station in device-to-device (D2D), vehicle-to-everything (V2X), and machine-to-machine (M2M) communication, and internet of things communication. This is not specifically limited in at least one embodiment.

The terminal device in at least one embodiment includes various handheld devices, in-vehicle devices, wearable devices, or computing devices that have a wireless communication function, or other processing devices connected to a wireless modem. The terminal device is also referred to as a terminal. Alternatively, the terminal device is a subscriber unit, a cellular phone, a smartphone, a wireless data card, a personal digital assistant (PDA) computer, a tablet computer, a wireless modem, a handheld device (handset), a laptop computer, a machine type communication (MTC) terminal, or the like. This is not limited herein.

In at least one embodiment, there is alternatively more or fewer terminal devices in the communication system, and a quantity of the terminal devices and types of the terminal devices are determined based on an actual requirement. This is not specifically limited herein.

The terminal device mentioned in at least one embodiment is a device having a wireless transceiver function, and is specifically user equipment (UE), an access terminal, a subscriber unit, a subscriber station, a mobile station, a remote station, a remote terminal, a mobile device, a user terminal, a wireless communication device, a user agent, or a user apparatus. Alternatively, the terminal device is a satellite phone, a cellular phone, a smartphone, a wireless data card, a wireless modem, a machine type communication device, a cordless phone, a session initiation protocol (SIP) phone, a wireless local loop (WLL) station, a personal digital assistant (PDA), a handheld device that has a wireless communication function, a computing device or another processing device connected to a wireless modem, an in-vehicle device, a communication device carried on a high-altitude aircraft, a wearable device, an unmanned aerial vehicle, a robot, a terminal in device-to-device (D2D) communication, a terminal in vehicle to everything (V2X), a virtual reality (VR) terminal device, an augmented reality (AR) terminal device, a mixed reality (MR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in smart home, a terminal device in a future communication network, or the like. This is not limited in at least one embodiment.

In at least one embodiment, in response to the transmitting communication apparatus 110 being a network device, the receiving communication apparatus 120 is a terminal device, or is a network device; or in response to the transmitting communication apparatus 110 being a terminal device, the receiving communication apparatus 120 is a network device, or is a terminal device. This is not limited herein.

The foregoing describes the architecture of the communication system in at least one embodiment. The following describes a process of data processing and transmission in a machine learning model and how to train the machine learning model in at least one embodiment.

2. Data Processing and Transmission in a Machine Learning Model System.

In at least one embodiment, the machine learning model system 200 in FIG. 1a is a neural network system. The following uses the neural network system as an example to describe the process of data processing and transmission in the machine learning model system 200. FIG. 1c is a schematic diagram of a neural network system according to at least one embodiment. A first neural network 210A is deployed on the transmitting communication apparatus 110, and a second neural network 220A is deployed on the receiving communication apparatus 120. In FIG. 1c, s is an input value of the neural network system. s is input into the first neural network 210A, and the first neural network 210A obtains a corresponding output value X through calculation, and sends X to the second neural network 220A through a communication channel Due to impact of the communication channel, X changes to Y after transmission. Y is input into the second neural network 220A, and the second neural network 220A obtains a corresponding output value r through calculation, where r is an output value obtained by the entire neural network system based on the input value s. In response to the neural network system being configured only to transmit data, r is a restoration value of s in the neural network system. In addition to data transmission, the neural network system is further configured to perform image processing, data calculation, and the like. In this case, r is a corresponding inference result.

Because the communication channel changes with time, Y also changes with the channel Consequently, a parameter of the first neural network 210A and a parameter of the second neural network 220A need to be adjusted based on the channel change, to ensure that the accurate output value r is obtained in the neural network system after the parameters are adjusted.

The foregoing uses the neural network system as an example to describe why the machine learning model system is to be trained. The following describes a specific process of training the machine learning model system.

In the process of training the machine learning model system, the transmitting communication apparatus 110 inputs training data into the first machine learning model 210, to obtain a forward inference result. The transmitting communication apparatus 110 sends the forward inference result to the receiving communication apparatus 120. The receiving communication apparatus inputs the forward inference result into the second machine learning model 220, to obtain an output value, and then obtains a first gradient and a second gradient through calculation based on the output value. The first gradient is for updating the parameter $\theta$ of the first neural network 210A, and the second gradient is for updating the parameter $\omega$ of the second neural network 220A. After obtaining the first gradient, the receiving communication apparatus 120 sends the first gradient to the transmitting communication apparatus 110, and the transmitting communication apparatus 110 then updates a parameter $\theta$ of the first machine learning model 210 based on the first gradient. A process of updating the first machine learning model and the second machine learning model by using the first gradient and the second gradient is referred to as a gradient reverse transfer. The first gradient for updating the first machine learning model is referred to as a reverse gradient below.

In other words, in a training process of the machine learning model, the transmitting communication apparatus 110 is to send the forward inference result to the receiving communication apparatus 120, and the receiving communication apparatus 120 further is to feed back, to the transmitting communication apparatus 110, the reverse gradient obtained based on the forward inference result.

In at least one embodiment, because the receiving communication apparatus 120 also is to perform an action of sending data, to avoid confusion, subsequently, a first communication apparatus is uniformly used to represent the transmitting communication apparatus 110, and a second communication apparatus is uniformly used to represent the receiving communication apparatus 120.

In at least one embodiment, the data transmitted from the first communication apparatus to the second communication apparatus is the forward inference result, and therefore a direction from the first communication apparatus to the second communication apparatus is referred to as a forward direction; and the data transmitted from the second communication apparatus to the first communication apparatus is the reverse gradient, and therefore a direction from the second communication apparatus to the first communication apparatus is referred to as a reverse direction.

In a communication system, data transmission resources between the first communication apparatus and the second communication apparatus are indicated by using control signaling. In the process of data transmission, only in response to both the first communication apparatus and the second communication apparatus learning of the transmission resources in the forward direction and in the reverse direction, the first communication apparatus and the second communication apparatus successfully transmits the data on the resources.

To enable both the first communication apparatus and the second communication apparatus to learn of the transmission resources for the forward inference result and the reverse gradient, the control signaling is transmitted to the first communication apparatus and/or the second communication apparatus. The control signaling indicates the transmission resources for the data. Specifically, the control signaling is generated and transmitted by any one of the first communication apparatus, the second communication apparatus, or the central control device, so that both the first communication apparatus and the second communication apparatus learn of content in the control signaling. For example, in response to the control signaling being generated by the first communication apparatus, the first communication apparatus transmits the control signaling to the second communication apparatus. Other cases are deduced by analogy, and details are not described again.

In at least one embodiment, the control signaling includes only the data transmission resource in one of the forward direction and the reverse direction. Because the training of the machine learning model system requires data transmission in the two directions, the control signaling is sent once during transmission in each of the forward direction and the reverse direction, and the training of the machine learning model system is completed in need of performing a plurality of times of the data transmission, resulting in a large quantity of pieces of control signaling, and large overheads of the control signaling in the communication system.

In view of the foregoing disadvantages, embodiments described herein provide a data transmission method and a related device, to train, at low signaling overheads, machine learning models deployed at a transmitting side and a receiving side in an end-to-end communication system, and complete data transmission between the transmitting side and the receiving side in the communication system. The following describes the data transmission method provided in at least one embodiment.

II. Data Transmission Method in at Least One Embodiment.

Figure 2:
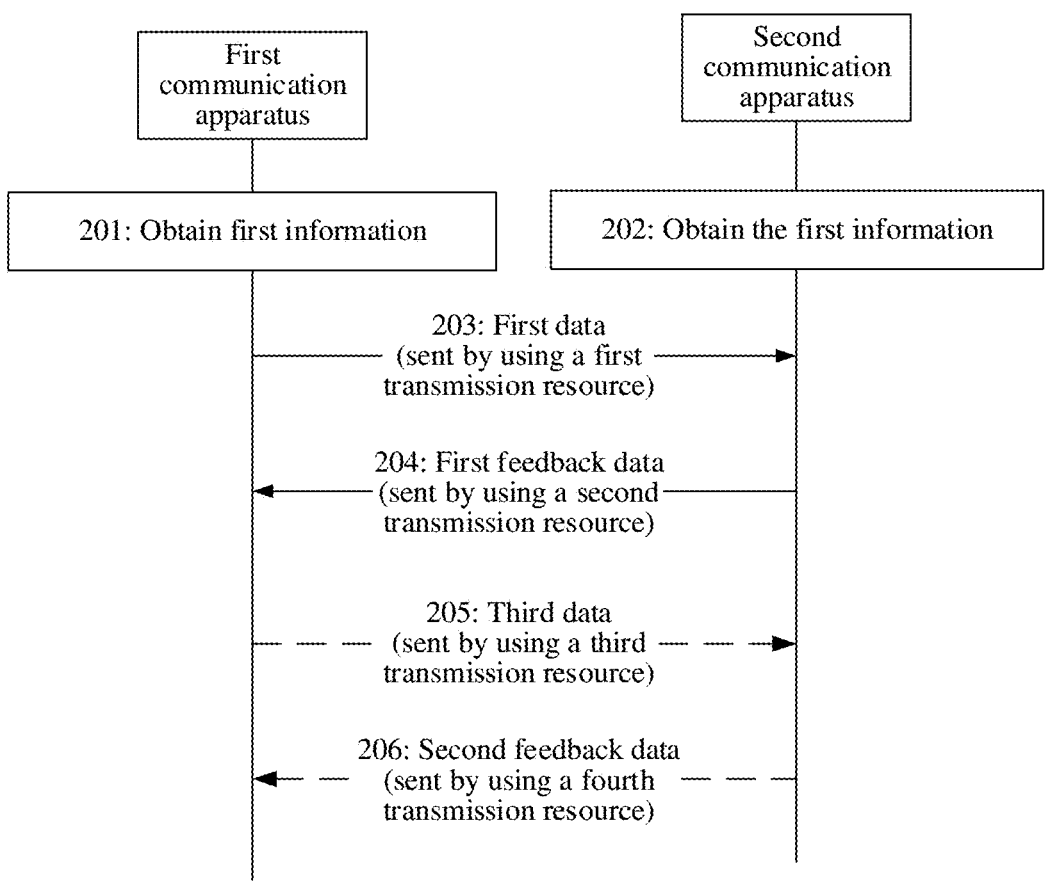
FIG. 2 is a schematic interaction diagram of a data transmission method according to at least one embodiment.

FIG. 2 is a schematic interaction diagram of a data transmission method according to at least one embodiment. The method includes the following steps.

201: A first communication apparatus obtains first information.

In a training process of a machine learning network model system, the first communication apparatus is to determine a forward transmission resource for transmitting a forward inference result and a reverse transmission resource for transmitting a reverse gradient. Specifically, the first communication apparatus determines the forward transmission resource and the reverse transmission resource by using the first information.

The first communication apparatus obtains the first information, where the first information includes indication information of a first transmission resource and a second transmission resource. The first transmission resource is the forward transmission resource, and the second transmission resource is the reverse transmission resource.

Optionally, in at least one embodiment, the first communication apparatus obtains the first information by receiving training control information (TCI). Similar to downlink control information (DCI) and uplink control information (UCI), the TCI also indicates a transmission resource. A difference lies in that the DCI and the UCI indicate only a transmission resource in one direction, but the TCI indicates transmission resources in a forward direction and a reverse direction.

In at least one embodiment, to more clearly describe information indicated by the TCI, a training unit (TU) is defined. The TU includes the forward transmission resource and the reverse transmission resource, and is configured to transmit the forward inference result and the reverse gradient that are required for training the machine learning model system.

In different dimensions, a plurality of types of Tus is obtained through classification, for example, based on a type of a bearer resource, a size ratio of the forward transmission resource to the reverse transmission resource in the TU, and a resource location indicated by the TU. The following separately describes different types of Tus.

(1) Single-Resource TU and Multi-Resource TU.

Optionally, the TU is classified into a single-resource TU and a multi-resource TU based on the type of the bearer resource.

Figure 3A:
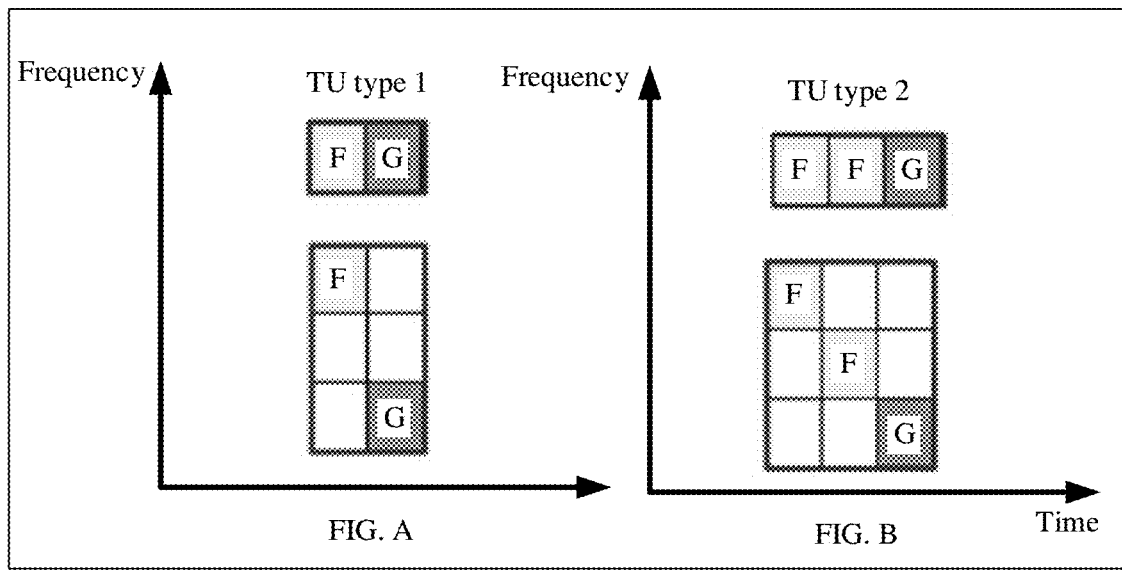
FIG. 3a is a schematic diagram of a single-resource transmission resource unit TU according to at least one embodiment.

The single-resource TU includes transmission resources for a single round of training of the machine learning model system. FIG. 3a is a schematic diagram of a single-resource TU according to at least one embodiment. The single-resource TU includes forward and reverse transmission resources required for one round of training. In the figure, F indicates the forward transmission resource, and G indicates the reverse transmission resource.

In at least one embodiment, a first transmission resource and a second transmission resource are used as an example for description. The first transmission resource included in the TU is the forward transmission resource in a round of training, and the second transmission resource included in the TU is the reverse transmission resource in the round of training.

In at least one embodiment, the first transmission resource and the second transmission resource alternatively is not transmission resources in a same round of training. This is not limited herein.

In at least one embodiment, in response to the single-resource TU including the forward transmission resource and the reverse transmission resource in the same round, the transmission resources required for one round of training of the machine learning model training is indicated in one piece of TCI. In response to the TCI being separate control signaling, one piece of control signaling indicates the transmission resources required for the one round of training of the machine learning model, so that a quantity of pieces of control signaling in a communication system is reduced.

Figure 3B:
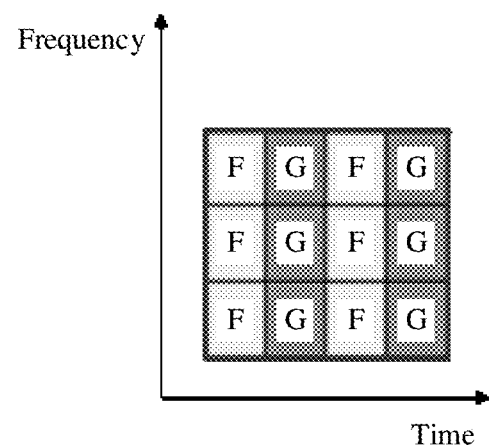
FIG. 3b is a schematic diagram of a multi-resource TU according to at least one embodiment.

The multi-resource TU includes transmission resources required for a plurality of rounds of training. As shown in FIG. 3b, one multi-resource TU includes forward and reverse transmission resources required for a plurality of rounds of end-to-end training. To reduce interference between forward and reverse transmission, the forward and reverse transmission resources do not appear in a same time period.

For example, the TU includes a first transmission resource to a fourth transmission resource. The first transmission resource is a forward transmission resource in a first round, and the second transmission resource is a reverse transmission resource in the first round. The third transmission resource is a forward transmission resource in a second round, and the fourth transmission resource is a reverse transmission resource in the second round. A time sequence between the two rounds is not limited, and the first round and the second round are only used to distinguish between different rounds. The foregoing two rounds are merely an example of the plurality of rounds of training included in the TU, and a quantity of rounds of training included in the TU Is not limited. In at least one embodiment, the TU includes transmission resources required for more rounds of training. This is not limited herein.

(2) TU Type.

Different TU types is determined based on the size ratio of the forward transmission resource to the reverse transmission resource in the TU.

In different rounds of training, a forward transmission data amount and a reverse transmission data amount varies, and the size ratio of the forward transmission resource to the reverse transmission resource is different. Therefore, in at least one embodiment, a plurality of TU types are defined, and ratios of the forward transmission resource to the reverse transmission resources in a TU are different in different types. For example, as shown in FIG. A in FIG. 3a, a ratio of the forward transmission resource to the reverse transmission resource in a TU type 1 is 1:1. As shown in FIG. B in FIG. 3a, a ratio of the forward transmission resource to the reverse transmission resource in a type 2 is 2:1.

In a case of the multi-resource TU, a plurality of TU types is defined, and correspond to different ratios of the forward transmission resource to the reverse transmission resource.

Optionally, at an early stage of training (in a training process of a round ranked at the front), or in a case in which data transmission (analog transmission, which will be explained in step 602 in the embodiment shown in FIG. 6) is directly performed through an air interface, data amounts of forward inference and reverse gradient backhaul are almost the same. Therefore, in the plurality of rounds of training, communication required for training is performed by using the TU type 1, namely, the ratio 1:1 of the forward transmission resource to the reverse transmission resource. As training is performed, values of a large quantity of gradients gradually approach 0, and the data amount of the reverse gradient gradually decreases. Therefore, in the training, the resources required for reverse transmission are gradually less than the resources required for forward transmission. For example, in response to a number of training rounds being greater than 0 and less than 50, the forward transmission data amount is almost the same as the reverse transmission data amount, and the TU type 1 is selected. In response to a number of training rounds being greater than or equal to 50 and less than 100, the reverse transmission data amount is close to half of the forward transmission data amount, and therefore the TU type 2 is selected.

(3) Fixed-Location TU and Dynamic-Location TU.

The TU is classified into a fixed-location TU and a dynamic-location TU based on the resource location indicated by the TU.

Figure 4A:
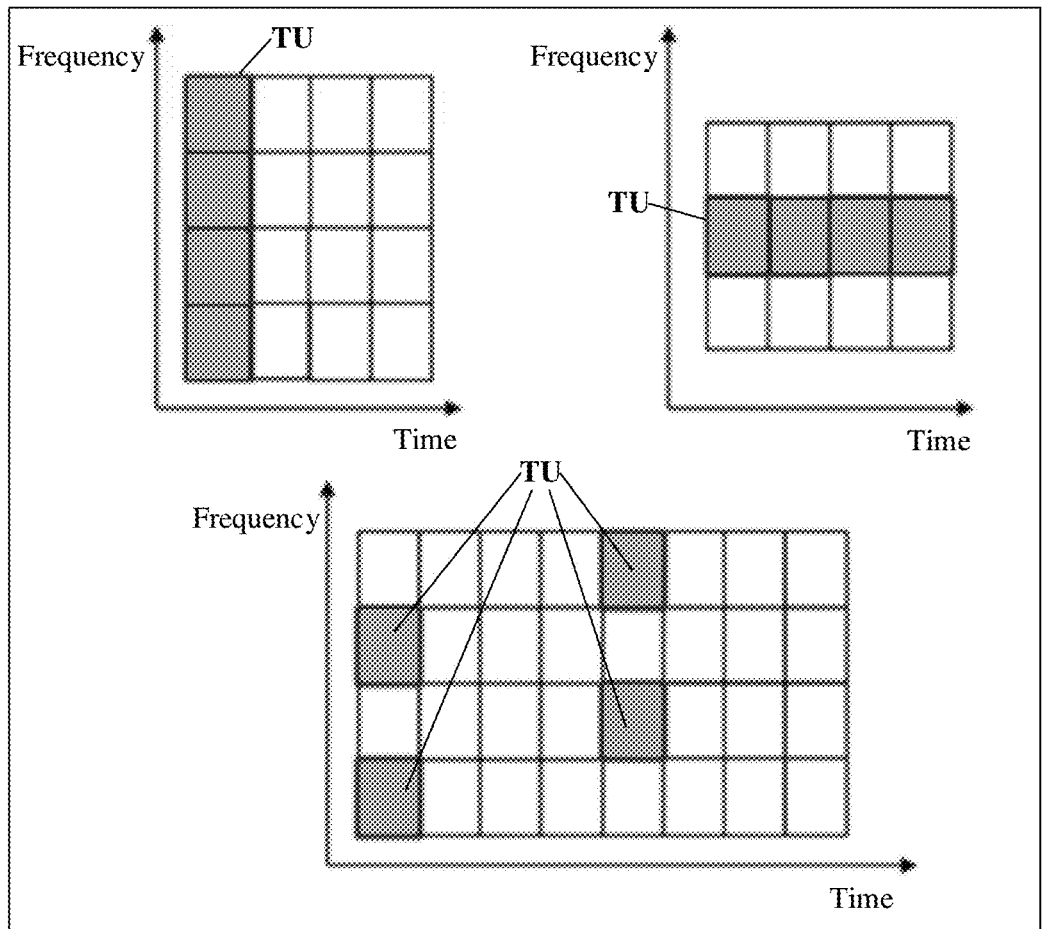
FIG. 4a is a schematic diagram of a fixed TU type according to at least one embodiment.

Fixed-location TU: As shown in FIG. 4a, the TU is configured at a fixed resource location.

Figure 4B:
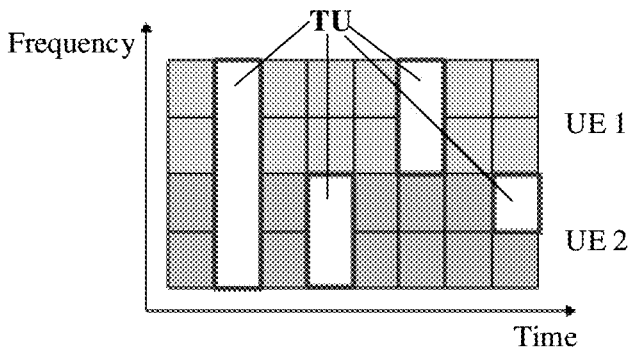
FIG. 4b is a schematic diagram of a dynamic TU type according to at least one embodiment.

Dynamic-location TU: As shown in FIG. 4b, a location of the TU is not fixed, and the TU is configured at a dynamically variable resource location.

Optionally, transmission required for training an end-to-end machine learning model is performed by dynamically selecting some resources from transmission resources occupied by another service (for example, an eMBB service). For example, as shown in FIG. 4b, a transmission resource of user equipment (UE) 1 and a transmission resource of UE 2 are occupied.

Optionally, as shown in FIG. 4a, in a case of the fixed-location TU, the first transmission resource and the second transmission resource is configured at fixed time-frequency transmission resource locations. In at least one embodiment, in addition to being configured at the fixed time-frequency locations, the transmission resources alternatively is not allocated in two dimensions: time domain and frequency domain. Instead, the transmission resources are configured at fixed time domain transmission resource locations, or the transmission resources are configured at fixed frequency domain transmission resource locations. This is not limited herein. In at least one embodiment, in addition to time domain or frequency domain, the first transmission resource and the second transmission resource is further configured at fixed transmission resource locations in another dimension. For example, the another dimension is a dimension such as space domain, code domain, or power domain. This is not limited herein.

In a case of the fixed-location TU, the TU is configured on the fixed transmission resource. In response to an identifier being used to represent the fixed transmission resource, the transmission resources in two directions is represented by using a small amount of data, so that a data amount of the TCI is reduced, thereby reducing overheads of control signaling.

For example, there are a total of 16 resource blocks in an upper left corner of FIG. 4a, and at least four bits are needed to indicate 16 resource block locations. In response to the TU being fixedly configured in four resource blocks shown in a shadow part in the figure, only two bits are needed to indicate the resource locations in which the TU is located, so that a data amount of TCI is reduced.

Optionally, as shown in FIG. 4b, in a case of the dynamic-location TU, the TU is configured at the time domain resource locations for transmitting service data. In at least one embodiment, in addition to time domain, the first transmission resource and the second transmission resource is further configured at resource locations that are in another dimension and that are for transmitting the service data. For example, the another dimension is a dimension such as frequency domain, space domain, code domain, or power domain. This is not limited herein.

In the case of the dynamic-location TU, the TU is configured in resource blocks used for transmitting the service data, so that the training of the machine learning model system is performed in a process of transmitting the service data, thereby improving training flexibility, reducing a latency of allocating the transmission resources required for waiting for training, and improving training efficiency of the machine learning model system.

In at least one embodiment, the training unit TU is also referred to as a transmission resource unit. Data content transmitted on the forward and reverse transmission resources in the TU is not limited. In addition to the forward inference result and the reverse gradient, the forward and reverse transmission resources is also for transmitting other data. This is not limited herein.

In at least one embodiment, an application scenario of the TCI is not limited. In addition to the training of the machine learning model system, the TCI is further applied to another scenario, provided that data is transmitted through exchange between two communication apparatuses in this scenario. This is not limited herein.

In at least one embodiment, the TCI includes information about a frequency domain location at which the TU is located and information about a time domain location at which the TU is located.

Optionally, in at least one embodiment, the TCI further includes a forward transmission modulation and coding scheme and a reverse transmission modulation and coding scheme.

In at least one embodiment, the TCI includes: information about a frequency domain location at which a forward transmission resource in a current round is located, information about a time domain location at which the forward transmission resource in the current round is located, information about a frequency domain location at which a reverse transmission resource in the current round is located, and information about a time domain location at which the reverse transmission resource in the current round is located.

The machine learning model system is trained in a plurality of rounds. In at least one embodiment, a round is a training round of the machine learning model system, and one round of training includes transmission of the forward inference result and transmission of the reverse gradient.

Optionally, in response to resources in the plurality of rounds being in a same TU, the foregoing fields, to be information about a frequency domain location at which a forward transmission resource in a first round is located, information about a time domain location at which the forward transmission resource in the first round is located, information about a frequency domain location at which a reverse transmission resource in the first round is located, and information about a time domain location at which the reverse transmission resource in the first round is located; information about a frequency domain location at which a forward transmission resource in a second round is located, information about a time domain location at which the forward transmission resource in the second round is located, information about a frequency domain location at which a reverse transmission resource in the second round is located, and information about a time domain location at which the reverse transmission resource in the second round is located; . . . ; and information about a frequency domain location at which a forward transmission resource in a $k^{th}$ round is located, information about a time domain location at which the forward transmission resource in the $k^{th}$ round is located, information about a frequency domain location at which a reverse transmission resource in the $k^{th}$ round is located, and information about a time domain location at which the reverse transmission resource in the $k^{th}$ round is located are repeated. The locations, at which the resources are located, required for the plurality of rounds of training in the same multi-resource TU are indicated in this form.

In at least one embodiment, in response to the resources in the plurality of rounds being in the same TU, content included in the repeated fields is not limited. As described above, each repeated field includes the information about the frequency domain locations at which the forward and reverse transmission resources are located and information about the time domain locations at which the forward and reverse transmission resources are located in the same round. Actually, a sequence of the content in the repeated fields and the content included in the repeated fields are not limited, provided that the repeated fields indicate the transmission resources to be used in a single round of training. This is not limited herein.

Optionally, the TCI of the multi-resource TU alternatively includes identifiers, for indicating training rounds corresponding to transmission resources, to distinguish between the different training rounds.

In a manner of distinguishing between the different training rounds by using a location relationship between the repeated fields corresponding to the different rounds in TCI fields, no additional identifier is needed to indicate the training round corresponding to the transmission resources, so that a data amount of the TCI is reduced, and signaling overheads are reduced.

Optionally, in the case of a fixed TU, the transmission resources in the different training rounds is alternatively distinguished from each other by using the identifiers or the location relationship between the repeated fields in the TCI fields.

In at least one embodiment, in addition to receiving the TCI, the first communication apparatus alternatively obtains the first information in another manner. For example, the first communication apparatus determines the transmission resources in the first information, to obtain the first information. This is not limited herein.

The TCI is from a second communication apparatus, or is from another communication apparatus. Transmission of the TCI is described in detail in the following embodiments. This is not limited herein.

202: The second communication apparatus obtains the first information.

Same as the first communication apparatus, the second communication apparatus also determines the forward transmission resource and the reverse transmission resource, to train the machine learning network model system. Specifically, the second communication apparatus determines the forward transmission resource and the reverse transmission resource by using the first information.

Optionally, in at least one embodiment, the second communication apparatus determines the transmission resources in the first information, to obtain the first information; or obtains the first information by receiving the TCI. This is not limited herein.

The TCI is from the first communication apparatus, or is from another communication apparatus. Transmission of the TCI is described in detail in the following embodiments. This is not limited herein.

For descriptions of the TU and the TCI, refer to step 201. Details are not described herein again.

In at least one embodiment, a time sequence relationship between step 201 and step 202 is not limited. Step 201 is performed before step 202, or step 202 is performed before step 201. This is not limited herein.

203: The first communication apparatus sends the first data to the second communication apparatus on the first transmission resource.

The first transmission resource in the TU is for the first communication apparatus to send first data to the second communication apparatus, and the first data is a first output of the first machine learning model, namely, the forward inference result of the first machine learning model.

The first communication apparatus sends the first data to the second communication apparatus on the first transmission resource.

Optionally, the gradient obtained through calculation based on the first data is also for updating the second machine learning model. Details are described in the embodiments shown in FIG. 5 to FIG. 8. Details are not described herein again.

204: The second communication apparatus sends first feedback data to the first communication apparatus on the second transmission resource.

The second transmission resource is for the second communication apparatus to send first feedback data to the first communication apparatus. The first feedback data indicates a first gradient, the first gradient is the foregoing reverse gradient, and the first gradient is for updating the first machine learning model.

The second communication apparatus sends the first feedback data to the first communication apparatus on the second transmission resource.

Optionally, in response to the TU in step 201 and/or step 202 being the multi-resource TU, in addition to the first transmission resource and the second transmission resource, the TU further includes the third transmission resource and the fourth transmission resource. The third transmission resource is for the first communication apparatus to send third data to the second communication apparatus, and the third data is a third output of the first machine learning model. The fourth transmission resource is for the second communication apparatus to send second feedback data to the first communication apparatus, the second feedback data indicates a second gradient, and the second gradient is for updating the first machine learning model.

Optionally, in response to the TU including the third transmission resource and the fourth transmission resource, step 205 and step 206 is further performed.

205: The first communication apparatus sends the third data to the second communication apparatus on the third transmission resource.

The third transmission resource in the TU is for the first communication apparatus to send third data to the second communication apparatus, and the third data is a third output of the first machine learning model, namely, the forward inference result of the first machine learning model.

The first communication apparatus sends the third data to the second communication apparatus on the third transmission resource.

Optionally, similar to the first data, the gradient obtained through calculation based on the third data is also for updating the second machine learning model.

206: The second communication apparatus sends the second feedback data to the first communication apparatus on the fourth transmission resource.

The fourth transmission resource is for the second communication apparatus to send the second feedback data to the first communication apparatus, where the second feedback data indicates a second gradient, the second gradient is the foregoing reverse gradient, and the second gradient is for updating the first machine learning model.

The second communication apparatus sends the second feedback data to the first communication apparatus on the fourth transmission resource.

The machine learning model is trained in a plurality of rounds. Optionally, a unified TU type is used in the plurality of rounds, and is for example, the single-resource TU, the multi-resource TU, or a type-1 TU. Alternatively, a TU type is changed in a training process in a plurality of rounds. For example, the single-resource TU is first used, and is changed to the multi-resource TU starting from a round; or the type-1 TU is first used, and is changed to a type-2 TU starting from a round. This is not limited herein. Steps 205 and 206 are optional steps. In response to the TU not including the third transmission resource and the fourth transmission resource, steps 205 and 206 is not performed. This is not limited herein.

In at least one embodiment, the TU is determined by any one of the first communication apparatus, the second communication apparatus, and a central control device, and the TCI is also sent by the corresponding apparatus. Details are separately described below.

1. The First Communication Apparatus Determines the TU.

Figure 5:
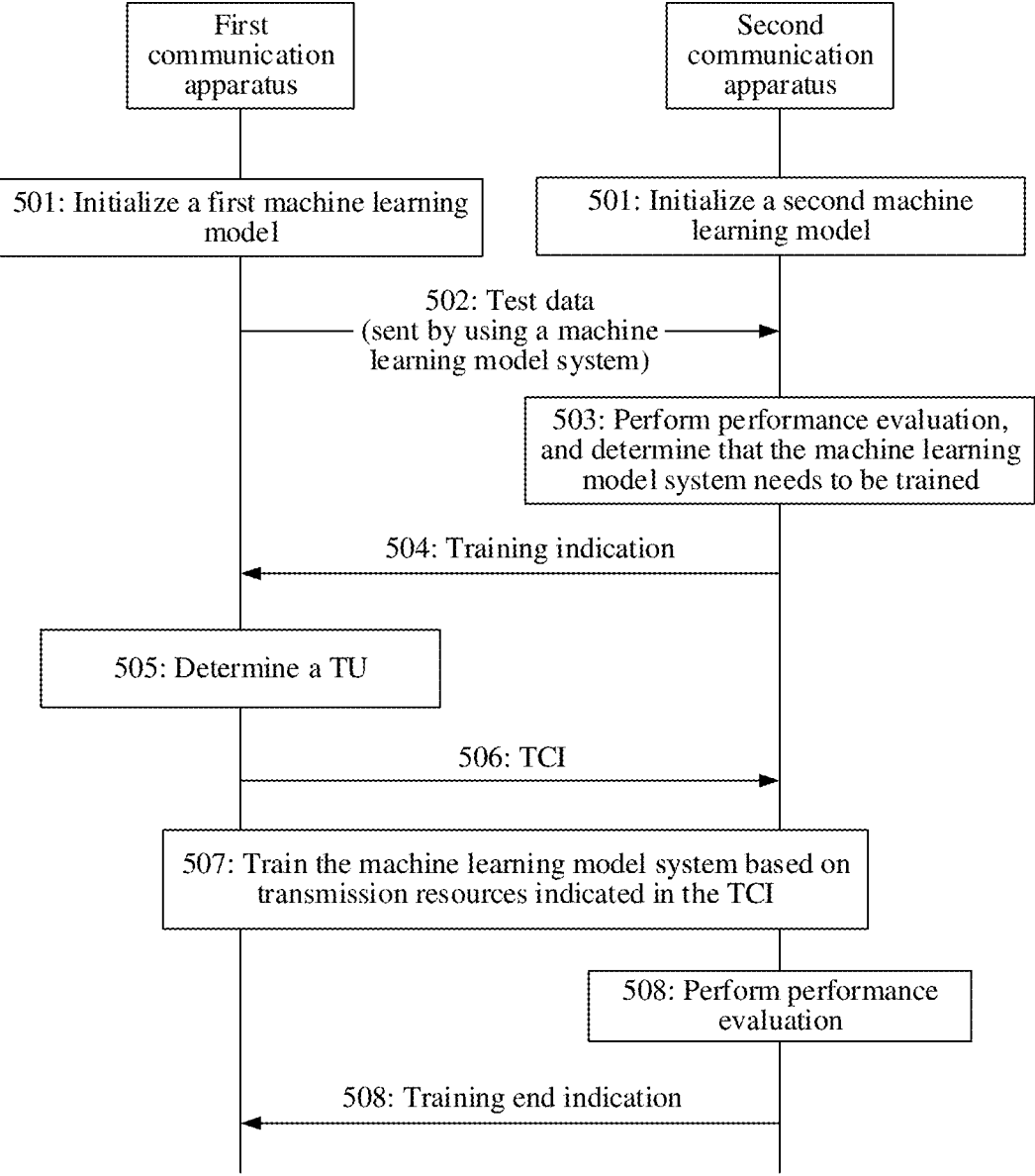
FIG. 5 is another schematic interaction diagram of a data transmission method according to at least one embodiment.

FIG. 5 is a flowchart of a data transmission method according to at least one embodiment. As shown in FIG. 5, the method includes the following steps.

501: A first communication apparatus initializes a first machine learning model, and a second communication apparatus initializes a second machine learning model.

Specifically, the machine learning model is initialized by using a local random initialization method. In addition to local initialization, the machine learning model is alternatively initialized in another manner. For example, a corresponding machine learning model parameter is downloaded from a specified model server. This is not limited herein.

Step 501 is an optional step. In a training process of a machine learning model system, step 501 does not need to be performed before each round of training.

502: The first communication apparatus transmits test data to the second communication apparatus by using the machine learning model system. Correspondingly, the second communication apparatus receives the test data.

The first machine learning model is deployed on the first communication apparatus. The test data that is transmitted to the second communication apparatus is input into the first machine learning model, to obtain a first output. In at least one embodiment, the first output is also referred to as first data.

The first communication apparatus transmits the first data to the second communication apparatus. Because a communication channel affects the data, the second communication apparatus receives second data. The second data is data obtained after the first data is transmitted through the channel.

The second machine learning model is deployed on the second communication apparatus. The second data is input into the second machine learning model, to obtain a second output. The second output is an inference result of the service data input into the first machine learning model.

In at least one embodiment, the machine learning model system including the first machine learning model and the second machine learning model not only transmit the foregoing service data, but also perform data processing, for example, perform semantic analysis and image classification. The second output obtained by using the second machine learning model is correspondingly a semantic analysis result, an image classification result, or the like. This is not limited herein.

Optionally, the test data transmitted in step 502 is alternatively service data, transmission signaling, or the like, provided that performance evaluation in step 503 is implemented. This is not limited herein.

503: The second communication apparatus performs performance evaluation, and determines that the machine learning model system is trained.

Based on a process of transmitting the service data in step 502, the second communication apparatus performs performance evaluation, to evaluate performance for performing data transmission based on the current machine learning model system. Specifically, the second communication apparatus evaluates a bit error rate of data transmission. In response to the bit error rate being higher than a threshold (for example, 0.1 commonly used in eMBB or 0.00001 commonly used in uRLLC), the second communication apparatus determines that the machine learning model system is trained.

In at least one embodiment, in addition to evaluating the bit error rate, the second communication apparatus further determines, by using other performance, whether the machine learning model system is trained. For example, the second communication apparatus evaluates performance such as a throughput and a latency. This is not limited herein. Optionally, in response to a latency in uRLLC being greater than or equal to 1 ms, the second communication apparatus determines that the machine learning model system is trained.

Optionally, after the second communication apparatus performs performance evaluation, in response to the second communication apparatus determining that the performance meets a preset condition, the machine learning model system does not need to be trained. In this case, step 502 and the performance evaluation is repeated until the performance cannot meet the preset condition, and it is determined that the machine learning model is trained (this means, step 503 occurs).

504: The second communication apparatus transmits a training indication to the first communication apparatus. Correspondingly, the first communication apparatus receives the training indication.

After determining that the machine learning model system is trained, the second communication apparatus transmits the training indication to the first communication apparatus. The training indication indicates to train the first machine learning model.

505: The first communication apparatus determines a TU.

After receiving the training indication, the first communication apparatus determines the transmission resource unit TU. The TU includes a first transmission resource and a second transmission resource. The first transmission resource is a forward transmission resource, and is for the first communication apparatus to transmit a forward inference result to the second communication apparatus. The second transmission resource is a reverse transmission resource, and is for the second communication apparatus to transmit a reverse gradient to the first communication apparatus.

506: The first communication apparatus transmits TCI to the second communication apparatus. Correspondingly, the second communication apparatus receives the TCI.

After determining the TU, the first communication apparatus determines the TCI, and transmit the TCI to the second communication apparatus. The TCI is indication information of the TU, and indicates location information of all the transmission resources included in the TU.

In at least one embodiment, the TCI is also referred to as first information. This is not limited herein.

In at least one embodiment, the TCI is not necessarily sent by the first communication apparatus. After determining the TU, the first communication apparatus alternatively notifies another device (for example, a relay device) of the TU, and the another device transmits the TCI to the second communication apparatus. This is not limited herein.

507: The first communication apparatus and the second communication apparatus train the machine learning model system based on the transmission resources indicated in the TCI.

The following uses a single-resource TU as an example, to describe a learning process of the machine learning model system.

The TU includes the first transmission resource and the second transmission resource, where the first transmission resource is a transmission resource for the forward inference result, and the second transmission resource indicates a transmission resource for the reverse gradient. The TCI includes the location information of the first transmission resource and the second transmission resource.

The first communication apparatus inputs training data into the first machine learning model, to obtain a first output. In at least one embodiment, the first output is also referred to as first data.

The first communication apparatus transmits the first data to the second communication apparatus on the first transmission resource. Because the communication channel affects the data, the second communication apparatus receives the second data on the first transmission resource. The second data is data obtained after the first data is transmitted through the channel.

The second communication apparatus inputs the second data into the second machine learning model, to obtain a second output. The second output is an inference result of the training data input into the first machine learning model.

In at least one embodiment, the machine learning model system including the first machine learning model and the second machine learning model not only transmit the service data, but also perform data processing, for example, perform semantic analysis and image classification. The second output obtained by using the second machine learning model is correspondingly a semantic analysis result, an image classification result, or the like. This is not limited herein.

The second communication apparatus obtains a first gradient through calculation based on the second output and a loss function of the machine learning model system, and the first gradient is for updating the first machine learning model. The second communication apparatus further obtains a third gradient through calculation based on the second output and the loss function of the machine learning model system, and the third gradient is for updating the second machine learning model.

After the first gradient is obtained through calculation, the second communication apparatus transmits first feedback data to the first communication apparatus on the second transmission resource, where the first feedback data indicates the first gradient.

After receiving the first feedback data on the second transmission resource, the first communication apparatus updates the first machine learning model based on the first gradient.

After the third gradient is obtained through calculation, the second communication apparatus updates the second machine learning model based on the third gradient.

The foregoing describes functions of the forward and reverse transmission resources in the single-resource TU in the training process of the machine learning model system. In response to the TU being a multi-resource TU, functions of forward and reverse transmission resources in each round are similar to functions of the first transmission resource and the second transmission resource. Details are not described herein again.

508: The second communication apparatus performs performance evaluation, and transmits a training end indication to the first communication apparatus. Correspondingly, the first communication apparatus receives the training end indication.

Based on the training process of the machine learning model system in step 507, the second communication apparatus performs performance evaluation on the trained machine learning model system. Specifically, the second communication apparatus evaluates a bit error rate of current transmission based on the transmission of the forward inference result in the previous round of training process. In response to the bit error rate being less than a threshold, the machine learning model system meets a use requirement, and the training on the machine learning model system is ended.

In at least one embodiment, in addition to evaluating the bit error rate, the second communication apparatus further determines, by using other performance, whether to end the training of the machine learning model system. For example, the second communication apparatus evaluates performance such as a throughput and a latency. This is not limited herein.

In response to determining that training of the machine learning model system is ended, the second communication apparatus transmits the training end indication to the first communication apparatus, where the training end indication is used to notify the training of the first machine learning model.

Optionally, after performing performance evaluation, in response to determining that the performance does not meet the preset condition, the second communication apparatus continues to train the machine learning model system, continues to perform the training process until the second communication apparatus determines that the performance meets the preset condition, determines that the training of the machine learning model system is ended, and triggers an action of transmitting the training end indication to the first communication apparatus in step 508. The training process includes: determining the TU, sending the TCI indicating the TU, training the machine learning model system based on the TCI, and performing, by the second communication apparatus, evaluation.

Existing control signaling indicates only a transmission resource in one direction. To train the machine learning model system once, the first communication apparatus or the second communication apparatus obtains two pieces of control signaling, to determine the transmission resources that are in two directions and that are for transmitting the forward inference result and the reverse gradient. In at least one embodiment, transmission resource information in the two directions is determined once by using the TCI indicating the transmission resources in the forward direction and the reverse direction. The TCI is sent as control signaling, an information amount of the transmission resource information carried in the control signaling is doubled, and a quantity of pieces of control signaling that is transmitted in the communication system is halved, so that overheads of the control signaling in the communication system are reduced.

In at least one embodiment, the forward transmission resource and the reverse transmission resource included in the TU alternatively is not used for the training of the machine learning system. As long as transmitted data appears in pairs, and transmission resources in the forward direction and the reverse direction are needed for transmission, the TCI provided in at least one embodiment indicates the transmission resources in the two directions. This is not limited herein.

A solution in which the first communication apparatus determines the TU is described in the embodiment shown in FIG. 5. The following describes, according to an embodiment shown in FIG. 6, a solution in which the second communication apparatus determines the TU.

The forward inference result and the reverse gradient is transmitted as data through processing such as coding and modulation, or is transmitted over an air interface in an analog manner. In the embodiment shown in FIG. 6, how analog transmission is implemented is described.

2. The Second Communication Apparatus Determines the TU.

Figure 6:
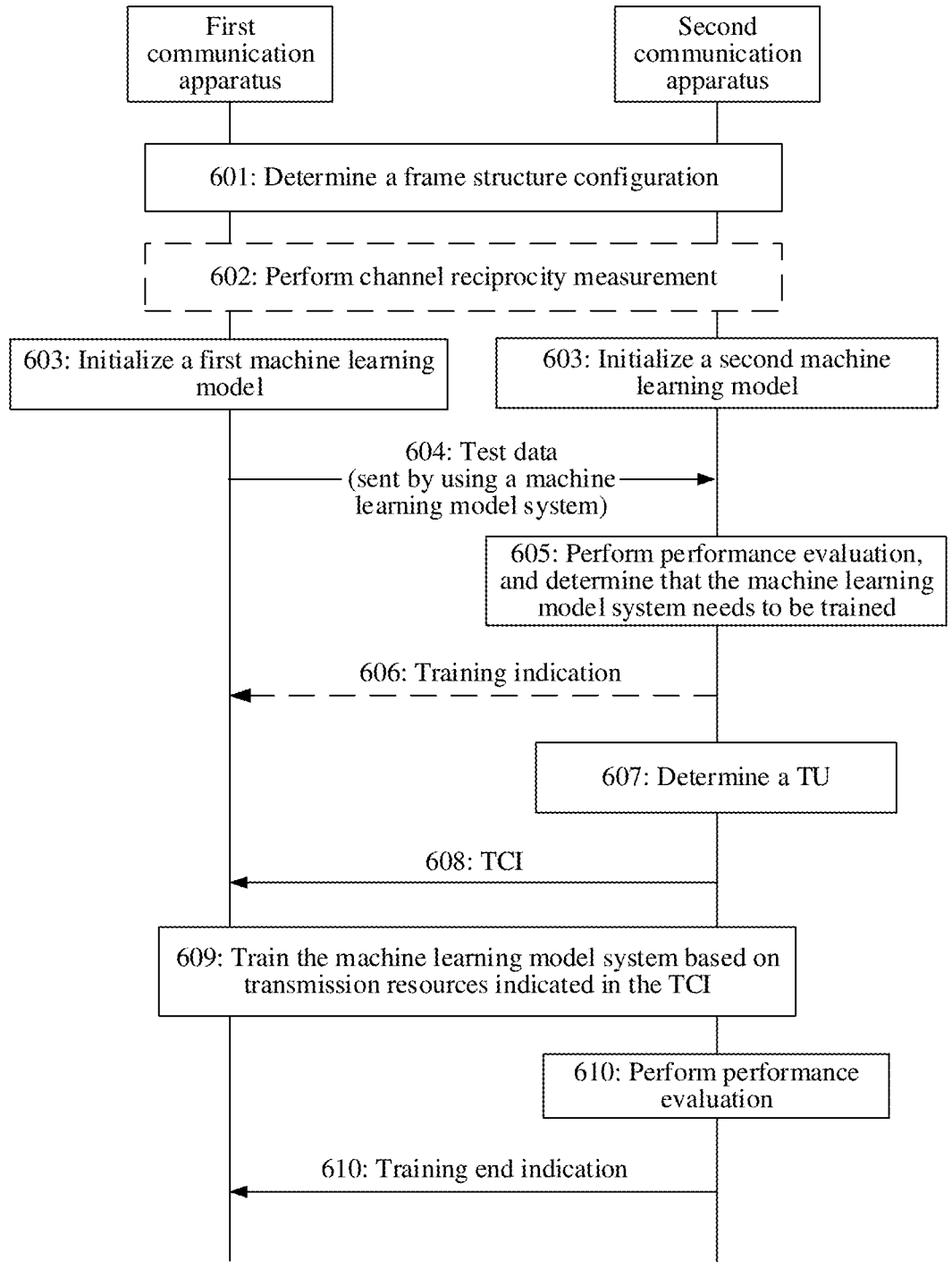
FIG. 6 is another schematic interaction diagram of a data transmission method according to at least one embodiment.

FIG. 6 is a flowchart of a data transmission method according to at least one embodiment. As shown in FIG. 6, the method includes the following steps.

601: Determine a frame structure configuration.

In at least one embodiment, a frame structure is a structure of a TU. In a process of the frame structure configuration, whether the TU uses a fixed-location TU or a dynamic-location TU is determined. In addition to determining a TU type, the frame structure configuration further determines other content related to the TU, for example, a single-resource TU or a multi-resource TU. This is not limited herein.

Optionally, step 601 is implemented by using a parameter configuration in response to a communication system being deployed.

Optionally, the frame structure configuration is given according to a standard. In addition to being given according to the standard, the frame structure configuration is alternatively determined in another manner, for example, is determined by a central control device. This is not limited herein.

Before step 501 in the embodiment shown in FIG. 5, step 601 is alternatively included. This is not limited herein.

Step 601 is an optional step. In a training process of a machine learning model system, step 601 does not need to be performed before each round of training.

Optionally, step 601 is performed in response to the communication system being established or updated. This is not limited herein.

602: Channel reciprocity measurement is performed between a first communication apparatus and a second communication apparatus.

Optionally, training of the machine learning model is implemented in a manner of analog transmission. The manner of the analog transmission is specifically that a forward inference result and a reverse gradient are transmitted in a form of an analog signal instead of digital processing. Because both data transmission in a forward direction and data transmission in a reverse direction exist between the first communication apparatus and the second communication apparatus, and the forward direction and the reverse direction are two opposite directions, channel reciprocity measurement is performed. The forward and reverse transmission of data between the two communication devices is implemented on a channel having reciprocity.

In at least one embodiment, the forward inference result indicates an output of a first machine learning model.

Figure 7A:
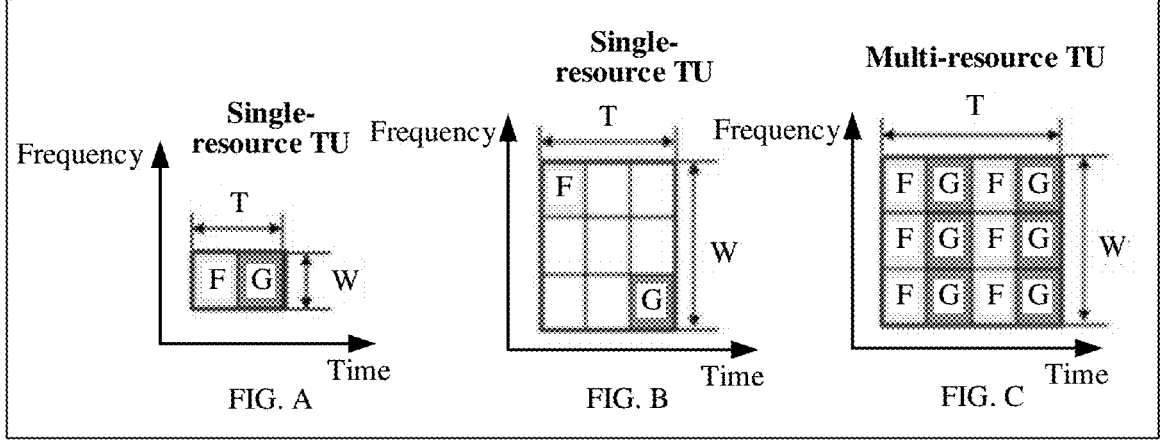
FIG. 7a is a schematic diagram of a TU in an analog gradient backhaul method according to at least one embodiment.

Optionally, after channel reciprocity measurement is performed, forward and reverse transmission resources having the reciprocity is determined. For example, as shown in FIG. 7a, the channel has the reciprocity in a time length T and frequency bandwidth W. In this case, a system parameter numerology (for example, a symbol length and a subcarrier spacing configuration) of the communication system is determined, so that a time domain length of the TU is less than or equal to T, and a frequency domain width is less than or equal to W.

As shown in FIG. 7a, in an analog transmission method, the TU is the single-resource TU shown in FIG. A or FIG. B, or is the multi-resource TU shown in FIG. C. This is not limited herein.

Figure 7B:
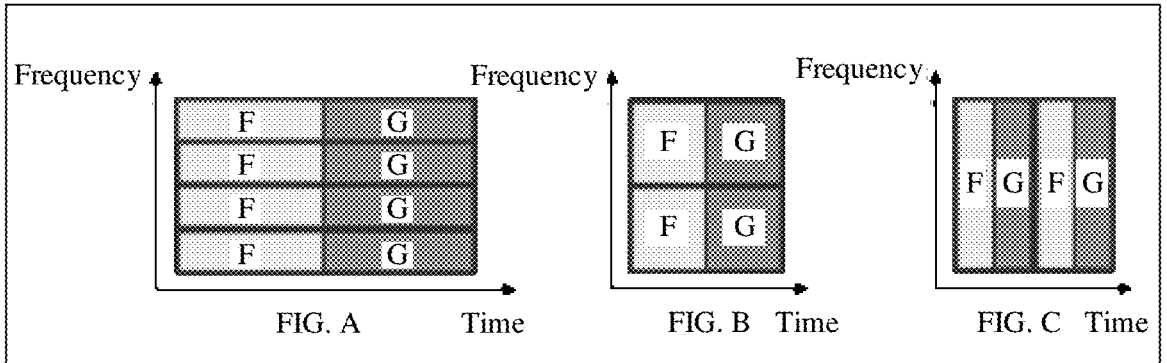
FIG. 7b is another schematic diagram of a TU in an analog gradient backhaul method according to at least one embodiment.

As shown in FIG. A in FIG. 7b, in response to a current communication environment being more stable, the time domain length having the reciprocity is longer, and the communication system selects a narrower subcarrier spacing and a longer symbol length. As shown in FIG. B or FIG. C in FIG. 7b, in response to the current communication environment being less unstable, the time domain length having the reciprocity is shorter, and a wider subcarrier spacing and a shorter symbol length are for the communication system.

In the embodiment shown in FIG. 5, in response to the machine learning model being trained in the manner of the analog transmission, step 602 also is performed before step 501. This is not limited herein.

Step 602 is an optional step. In a training process of a machine learning model system, step 602 does not need to be performed before each round of training.

Optionally, step 602 is performed in response to the communication system being established or updated. This is not limited herein.

603: The first communication apparatus initializes a first machine learning model, and the second communication apparatus initializes a second machine learning model.

Step 603 is an optional step. In a training process of a machine learning model system, step 603 does not need to be performed before each round of training.

Optionally, step 602 is performed in response to the communication system being established or updated. This is not limited herein.

Optionally, in this embodiment, step 601 to step 603 is performed, or is not performed, or some of the steps is performed. For example, step 602 is performed, and step 601 and step 603 are not performed; or step 601 and step 602 are performed, and step 603 is not performed. This is not limited herein.

604: The first communication apparatus transmits test data to the second communication apparatus by using the machine learning model system. Correspondingly, the second communication apparatus receives the test data.

605: The second communication apparatus performs performance evaluation, and determines that the machine learning model system is trained.

For step 603 to step 605, refer to step 501 to step 503 in the embodiment shown in FIG. 5. Details are not described herein again.

606: The second communication apparatus transmits a training indication to the first communication apparatus. Correspondingly, the first communication apparatus receives the training indication.

Optionally, after determining that the machine learning model system is trained, the second communication apparatus transmits the training indication to the first communication apparatus. The training indication indicates to train the first machine learning model.

607: The second communication apparatus determines the TU.

In step 605, after determining that the machine learning model system is trained, the second communication apparatus determines the transmission resource unit TU. For detailed descriptions of the TU, refer to step 505 in the embodiment shown in FIG. 5. Details are not described herein again.

In response to step 606 existing, step 607 is performed before or after step 606, provided that step 607 is performed after step 605. This is not limited herein.

608: The second communication apparatus transmits TCI to the first communication apparatus. Correspondingly, the first communication apparatus receives the TCI.

After determining the TU, the second communication apparatus determines the TCI, and transmit the TCI to the first communication apparatus. The TCI is indication information of the TU, and indicates location information of all the transmission resources included in the TU.

In at least one embodiment, the TCI is not necessarily sent by the second communication apparatus. After determining the TU, the second communication apparatus alternatively notifies another device (for example, a relay device) of the TU, and the another device transmits the TCI to the first communication apparatus. This is not limited herein.

In at least one embodiment, step 606 is an optional step. In step 608, in response to the second communication apparatus transmitting the TCI to the first communication apparatus, the first communication apparatus learns, based on the TCI, that the first machine learning model is trained. Therefore, the second communication apparatus alternatively does not transmit the training indication to the first communication apparatus.

In at least one embodiment, before the second communication apparatus transmits the TCI to the first communication apparatus (step 608), that the second communication apparatus transmits a training indication to the first communication apparatus (step 606) has advantages.

After receiving the training indication, the first communication apparatus starts a training process for the first machine learning model based on the training indication, for example, starts to calculate a first output. Compared with a manner in which after receiving the TCI is received, the first communication apparatus starts to calculate the first output, a manner in which in response to receiving the TCI, the first communication apparatus immediately transmits the first output to the second communication apparatus on the forward transmission resource indicated by the TCI improves training efficiency of the first machine learning model and the entire machine learning model system.

609: The first communication apparatus and the second communication apparatus train the machine learning model system based on the transmission resources indicated in the TCI.

610: The second communication apparatus performs performance evaluation, and transmits a training end indication to the first communication apparatus. Correspondingly, the first communication apparatus receives the training end indication.

For step 609 and step 610, refer to step 507 and step 508 in the embodiment shown in FIG. 5. Details are not described herein again.

In at least one embodiment, in response to the first communication apparatus being a network device, the second communication apparatus is a terminal device, or is a network device; or in response to the first communication apparatus being a terminal device, the second communication apparatus is a network device, or is a terminal device. This is not limited herein.

The solution in which the first communication apparatus or the second communication apparatus determines the TU is described in the embodiments in FIG. 5 and FIG. 6. The following describes, according to an embodiment shown in FIG. 8, a solution in which the central control device determines the TU.

3. The Central Control Device Determines the TU.

In response to the communication system including the central control device, and the central control device controlling data transmission between the first communication apparatus and the second communication apparatus, the central control device determines the TU.

Optionally, the first communication apparatus and the second communication apparatus is terminal devices, and the central control device is a network device.

Optionally, this embodiment of this application is applied to a D2D scenario. For example, in the D2D scenario, both the first communication apparatus and the second communication apparatus is terminal devices.

Specifically, the central control device is a base station. In at least one embodiment, in addition to the base station, the central control device is another communication apparatus, for example, an edge device, provided that the another communication apparatus has a capability of controlling the communication between the first communication apparatus and the second communication apparatus. This is not limited herein.

In at least one embodiment, one of the first communication apparatus and the second communication apparatus is a terminal device, and the other is a network device (for example, a base station). The central control device is configured to control communication between the network device and the terminal device.

Figure 8:
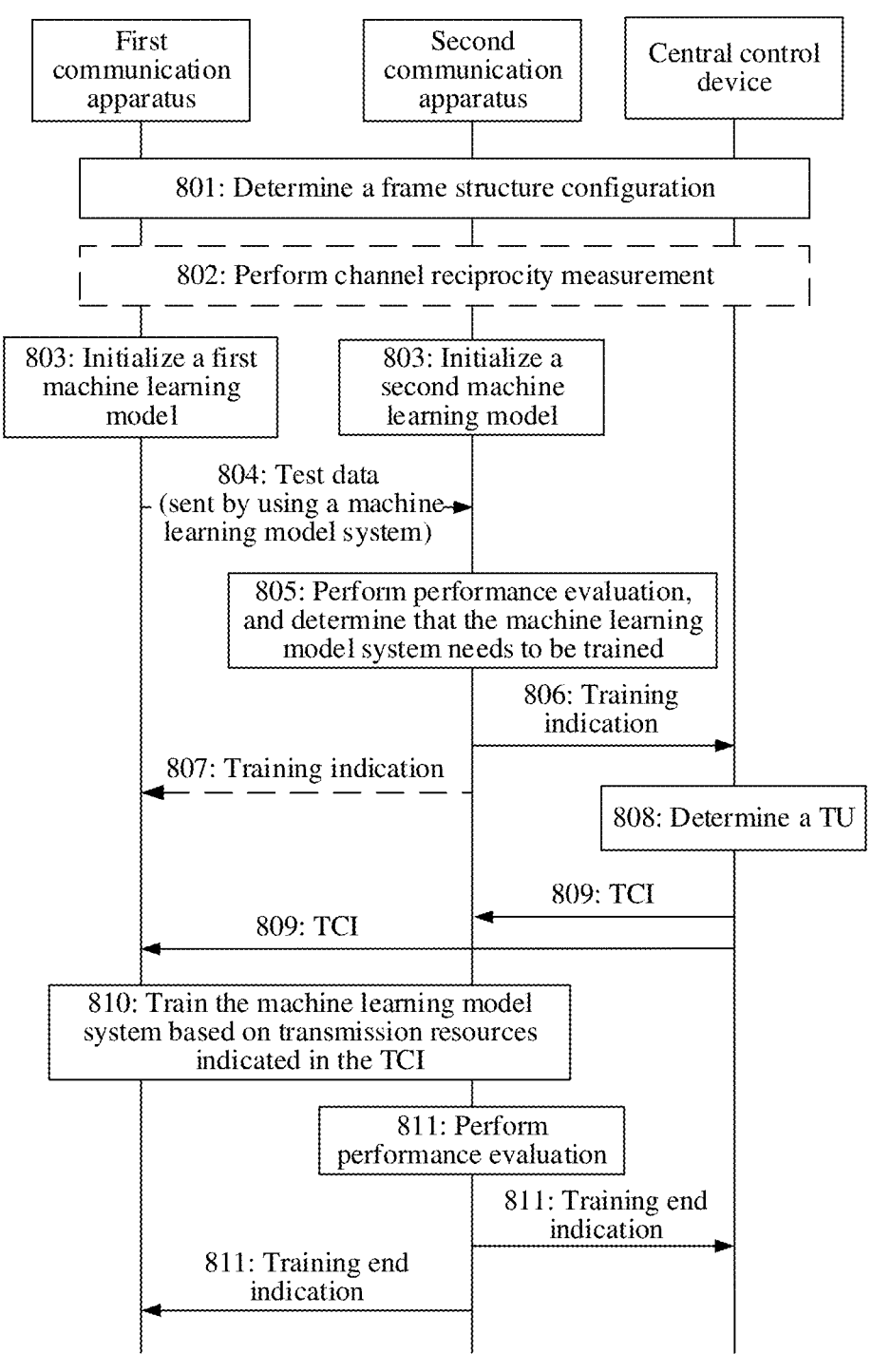
FIG. 8 is another schematic interaction diagram of a data transmission method according to at least one embodiment.

FIG. 8 is a flowchart of a data transmission method according to at least one embodiment. As shown in FIG. 8, the method includes the following steps.

801: Determine a frame structure configuration.

In at least one embodiment, a frame structure is a structure of a TU. In a process of the frame structure configuration, whether the TU uses a fixed-location TU or a dynamic-location TU is determined. In addition to determining a TU type, the frame structure configuration further determines other content related to the TU, for example, a single-resource TU or a multi-resource TU. This is not limited herein.

Optionally, step 801 is implemented by using a parameter configuration in response to a communication system being deployed.

Optionally, the frame structure configuration is given according to a standard. In addition to being given according to the standard, the frame structure configuration is alternatively determined in another manner, for example, is determined by a central control device. This is not limited herein.

802: Channel reciprocity measurement is performed between a first communication apparatus and a second communication apparatus.

803: The first communication apparatus initializes a first machine learning model, and the second communication apparatus initializes a second machine learning model.

Any step in step 801 to step 803 is an optional step. In a training process of a machine learning model system, step 801, step 802, or step 803 does not need to be performed before each round of training.

Optionally, any step in step 801 to step 803 is performed in response to the communication system being established or updated. This is not limited herein.

Optionally, in this embodiment, step 801 to step 803 is performed, or is not performed, or some of the steps is performed. For example, step 802 is performed, and step 801 and step 803 are not performed; or step 801 and step 802 are performed, and step 803 is not performed. This is not limited herein.

804: The first communication apparatus transmits service data to the second communication apparatus by using the machine learning model system.

805: The second communication apparatus performs performance evaluation, and determines that the machine learning model system is trained.

For step 802 to step 805, refer to descriptions of step 602 to step 605 in the embodiment shown in FIG. 6. Details are not described herein again. Step 802 and step 803 are optional steps.

806: The second communication apparatus transmits a training indication to the central control device. Correspondingly, the central control device receives the training indication.

After determining that the machine learning model system is trained, the second communication apparatus transmits the training indication to the central control device. The training indication indicates to train the machine learning model system.

807: The second communication apparatus transmits a training indication to the first communication apparatus. Correspondingly, the first communication apparatus receives the training indication.

Optionally, after determining that the machine learning model system is trained, the second communication apparatus transmits the training indication to the first communication apparatus. The training indication indicates to train the first machine learning model.

808: The central control device determines the TU.

After receiving the training indication, the central control device determines the transmission resource unit TU. For detailed descriptions of the TU, refer to step 505 in the embodiment shown in FIG. 5. Details are not described herein again.

809: The central control device transmits TCI to the first communication apparatus and the second communication apparatus. Correspondingly, the first communication apparatus and the second communication apparatus receive the TCI.

After determining the TU, the central control device determines the TCI, and transmit the TCI to the first communication apparatus and the second communication apparatus. The TCI is indication information of the TU, and indicates location information of all the transmission resources included in the TU.

In at least one embodiment, the TCI is not necessarily sent by the central control device. After determining the TU, the central control device alternatively notifies another device (for example, a relay device) of the TU, and the another device transmits the TCI to the first communication apparatus and the second communication apparatus. This is not limited herein.

In at least one embodiment, step 807 is an optional step. In step 809, in response to the central control device transmitting the TCI to the first communication apparatus, the first communication apparatus learns, based on the TCI, that the first machine learning model is trained. Therefore, the second communication apparatus alternatively does not transmit the training indication to the first communication apparatus. For beneficial effects of sending the training indication to a sending device, refer to descriptions before step 609 in the embodiment shown in FIG. 6. Details are not described herein again.

810: The first communication apparatus and the second communication apparatus train the machine learning model system based on the transmission resources indicated in the TCI.

For step 810, refer to step 507 in the embodiment shown in FIG. 5. Details are not described herein again.

811: The second communication apparatus performs performance evaluation, and transmits a training end indication to the first communication apparatus and the central control device. Correspondingly, the first communication apparatus and the central control device receive the training end indication.

For descriptions of performance evaluation performed by the second communication apparatus, refer to step 508 in the embodiment shown in FIG. 5.

After determining that the training of the machine learning model system is ended, the second communication apparatus transmits the training end indication to the first communication apparatus and the central control device. The training end indication is used to notify the training of the machine learning model system.

Based on the unified technical solution, this application further provides a corresponding apparatus embodiment. To implement functions in the communication method provided in at least one embodiment, the first communication apparatus, the second communication apparatus, and the third communication apparatus include a hardware structure and/or a software module, and implement the functions in a form of the hardware structure, the software module, or a combination of the hardware structure and the software module. Whether a function in the foregoing functions is performed in the form of the hardware structure, the software module, or the combination of the hardware structure and the software module depends on particular applications and design constraint conditions of the technical solutions.

The following describes a structure of a first communication apparatus provided in at least one embodiment.

1. Structure of the First Communication Apparatus.

In at least one embodiment, a first communication apparatus (a transmitting communication apparatus) is included in a communication system, and the communication system further includes a second communication apparatus (a receiving communication apparatus). A first machine learning model is deployed in the first communication apparatus, a second machine learning model is deployed in the second communication apparatus, and the first machine learning model and the second machine learning model are for implementing communication between the first communication apparatus and the second communication apparatus.

Figure 9:
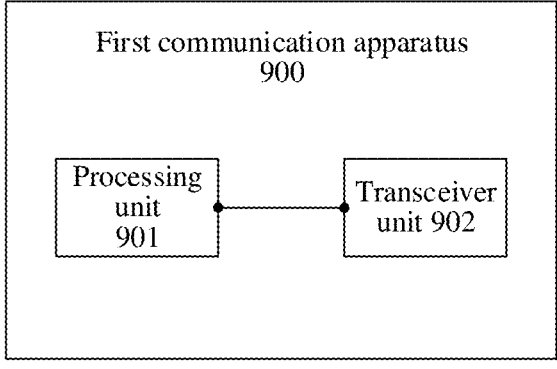
FIG. 9 is a schematic diagram of a structure of a first communication apparatus according to at least one embodiment.

As shown in FIG. 9, a first communication apparatus 900 includes: a processing unit 901 and a transceiver unit 902.

The processing unit 901 is configured to obtain first information, where the first information carries indication information of both a first transmission resource and a second transmission resource, where the first transmission resource is for transmitting first data to the second communication apparatus, and the first data is a first output of the first machine learning model; and the second transmission resource is for receiving first feedback data from the second communication apparatus, the first feedback data indicates a first gradient, and the first gradient is for updating the first machine learning model.

The transceiver unit 902 is configured to transmit the first data to the second communication apparatus on the first transmission resource.

In an optional implementation, the first gradient is obtained by the second communication apparatus through calculation based on a second output, the second output is an output obtained by inputting second data into the second machine learning model, and the second data is data obtained after the first data is transmitted through a channel.

In an optional implementation, the first information includes indication information of a transmission resource unit, and the first transmission resource and the second transmission resource are included in the transmission resource unit.

In an optional implementation, the first information carries indication information of both a third transmission resource and a fourth transmission resource, where the third transmission resource is for transmitting third data to the second communication apparatus, and the third data is a third output of the first machine learning model; and the fourth transmission resource is for receiving second feedback data from the second communication apparatus, the second feedback data indicates a second gradient, and the second gradient is for updating the first machine learning model.

The transceiver unit 902 is configured to transmit the third data to the second communication apparatus on the third transmission resource.

In an optional implementation, the first transmission resource and the second transmission resource are located at: fixed transmission resource locations in at least one of time domain, frequency domain, space domain, code domain, or power domain; or resource blocks that are in at least one of time domain, frequency domain, space domain, code domain, or power domain and that are for transmitting service data.

In an optional implementation, the transceiver unit 902 is configured to receive the first information from the second communication apparatus; or receive the first information from a third communication apparatus, where the third communication apparatus is configured to control the communication between the first communication apparatus and the second communication apparatus.

The processing unit 901 is specifically configured to obtain the first information from the transceiver unit 902.

In an optional implementation, the transceiver unit 902 is further configured to: obtain the first information from the processing unit 901; and transmit the first information to the second communication apparatus.

In an optional implementation, the transceiver unit 902 is further configured to receive a training indication from the second communication apparatus, where the training indication indicates to train the first machine learning model.

The foregoing describes the first communication apparatus provided in at least one embodiment. The following describes, with reference to FIG. 10, a structure of a second communication apparatus provided in at least one embodiment.

2. Structure of the Second Communication Apparatus.

In at least one embodiment, a second communication apparatus (a receiving communication apparatus) is included in a communication system, and the communication system further includes a first communication apparatus (a transmitting communication apparatus). A first machine learning model is deployed in the first communication apparatus, a second machine learning model is deployed in the second communication apparatus, and the first machine learning model and the second machine learning model are for implementing communication between the first communication apparatus and the second communication apparatus.

Figure 10:
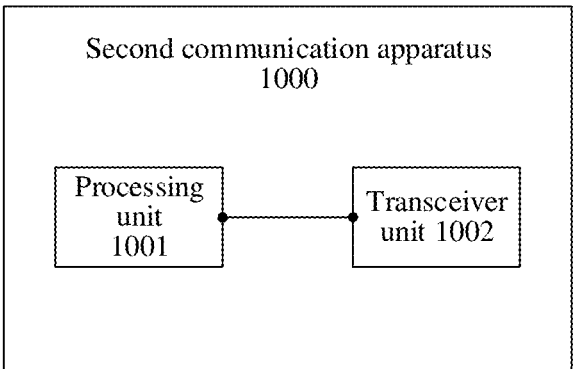
FIG. 10 is a schematic diagram of a structure of a second communication apparatus according to at least one embodiment.

As shown in FIG. 10, a second communication apparatus 1000 includes: a processing unit 1001 and a transceiver unit 1002.

The processing unit 1001 is configured to obtain first information, where the first information carries indication information of both a first transmission resource and a second transmission resource, where the first transmission resource is for receiving second data from the first communication apparatus, the second data is data obtained after first data is transmitted through a channel, and the first data is a first output of the first machine learning model; and the second transmission resource is for transmitting first feedback data to the first communication apparatus, the first feedback data indicates a first gradient, and the first gradient is for updating the first machine learning model.

The transceiver unit 1002 is configured to transmit the first feedback data to the first communication apparatus on the second transmission resource.

In an optional implementation, the first gradient is obtained by the second communication apparatus through calculation based on a second output, and the second output is an output obtained by inputting the second data into the second machine learning model.

In an optional implementation, the first information includes indication information of a transmission resource unit, and the first transmission resource and the second transmission resource are included in the transmission resource unit.

In an optional implementation, the first information carries indication information of both a third transmission resource and a fourth transmission resource, where the third transmission resource is for receiving fourth data from the first communication apparatus, the fourth data is data obtained after third data is transmitted through a channel, and the third data is a third output of the first machine learning model; and the fourth transmission resource is for transmitting second feedback data to the first communication apparatus, the second feedback data indicates a second gradient, and the second gradient is for updating the first machine learning model. The transceiver unit 1002 is configured to transmit the second feedback data to the first communication apparatus on the fourth transmission resource.

In an optional implementation, the first transmission resource and the second transmission resource are located at: fixed transmission resource locations in at least one of time domain, frequency domain, space domain, code domain, or power domain; or resource blocks that are in at least one of time domain, frequency domain, space domain, code domain, or power domain and that are for transmitting service data.

In an optional implementation, the transceiver unit 1002 is configured to receive the first information from the first communication apparatus; or receive the first information from a third communication apparatus, where the third communication apparatus is configured to control the communication between the first communication apparatus and the second communication apparatus.

The processing unit 1001 is specifically configured to obtain the first information from the transceiver unit 1002.

In an optional implementation, the transceiver unit 1002 is further configured to: obtain the first information from the processing unit 1001; and transmit the first information to the first communication apparatus.

In an optional implementation, the processing unit 1001 is further configured to generate a training indication, where the training indication indicates to train the first machine learning model.

The transceiver unit 1002 is further configured to send the training indication to the first communication apparatus.

In an optional implementation, the processing unit 1001 is further configured to generate a training indication, where the training indication indicates to train a machine learning model network.

The transceiver unit 1002 is further configured to: send the training indication to the third communication apparatus.

The foregoing describes the first communication apparatus and the second communication apparatus provided in at least one embodiment. The following describes, with reference to FIG. 11, a structure of a central control device provided in at least one embodiment.

3. Structure of the Central Control Device.

In at least one embodiment, the central control device is also referred to as a third communication apparatus. The third communication apparatus is included in a communication system, and the communication system further includes a first communication apparatus (a transmitting communication apparatus) and a second communication apparatus (a receiving communication apparatus). The third communication apparatus is configured to control communication between the first communication apparatus and the second communication apparatus. A first machine learning model is deployed in the first communication apparatus, a second machine learning model is deployed in the second communication apparatus, and the first machine learning model and the second machine learning model are for implementing the communication between the first communication apparatus and the second communication apparatus.

Figure 11:
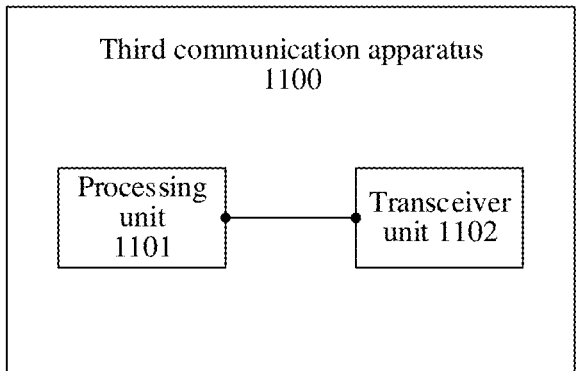
FIG. 11 is a schematic diagram of a structure of a central control device according to at least one embodiment.

As shown in FIG. 11, a third communication apparatus 1100 includes: a processing unit 1101 and a transceiver unit 1102.

The processing unit 1101 is configured to obtain first information, where the first information carries indication information of both a first transmission resource and a second transmission resource, where the first transmission resource is for the first communication apparatus to transmit first data to the second communication apparatus, and the first data is a first output of the first machine learning model; and the second transmission resource is for the second communication apparatus to transmit first feedback data to the first communication apparatus, the first feedback data indicates a first gradient, and the first gradient is for updating the first machine learning model.

The transceiver unit 1102 is configured to transmit the first information to the first communication apparatus and/or the second communication apparatus.

In an optional implementation, the first information includes indication information of a transmission resource unit, and the first transmission resource and the second transmission resource are included in the transmission resource unit.

In an optional implementation, the first information carries indication information of both a third transmission resource and a fourth transmission resource. The third transmission resource is for the first communication apparatus to transmit third data to the second communication apparatus, and the third data is a third output of the first machine learning model. The fourth transmission resource is for the second communication apparatus to transmit second feedback data to the first communication apparatus, the second feedback data indicates a second gradient, and the second gradient is for updating the first machine learning model.

In an optional implementation, the first transmission resource and the second transmission resource are located at: fixed transmission resource locations in at least one of time domain, frequency domain, space domain, code domain, or power domain; or resource blocks that are in at least one of time domain, frequency domain, space domain, code domain, or power domain and that are for transmitting service data.

In an optional implementation, the transceiver unit 1102 is configured to receive a training indication from the second communication apparatus, where the training indication indicates to train a machine learning model system.

In an optional implementation, the transceiver unit 1102 is further configured to receive a training indication from the second communication apparatus, where the training indication indicates to train a machine learning model network.

A person skilled in the art understands that, for the purpose of convenient and brief description, for detailed working processes of the foregoing system, apparatus, and unit, refer to corresponding processes in the foregoing method embodiments. Details are not described herein again.

Optionally, in addition to the foregoing structure, the communication apparatus in at least one embodiment alternatively has the following structure.

Figure 12:
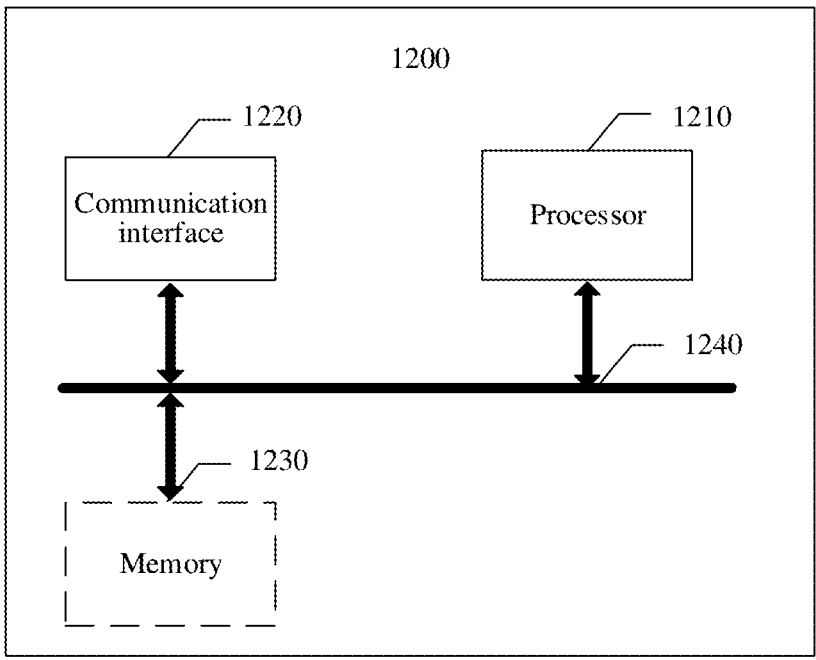
FIG. 12 is a schematic diagram of a structure of a communication apparatus according to at least one embodiment.

Refer to FIG. 12. At least one embodiment further provides a communication apparatus 1200, configured to implement functions of the terminal and the network device in the foregoing method, namely, functions of the first communication apparatus, the second communication apparatus, or the third communication apparatus. The communication apparatus is the first communication apparatus, the second communication apparatus, or the third communication apparatus; is an apparatus in the first communication apparatus, the second communication apparatus, or the third communication apparatus; or is an apparatus that is used together with the first communication apparatus, the second communication apparatus, or the third communication apparatus. The communication apparatus 1200 is a chip system. In at least one embodiment, the chip system includes a chip, or includes a chip and another discrete device. The communication apparatus 1200 includes at least one processor 1210, configured to implement the functions of the first communication apparatus, the second communication apparatus, or the third communication apparatus in the method provided in at least one embodiment. The communication apparatus 1200 further includes a communication interface 1220. In at least one embodiment, the communication interface 1220 is a transceiver, a circuit, a bus, a module, or a communication interface of another type, and is configured to communicate with another device via a transmission medium. For example, the communication interface 1220 is for an apparatus in the communication apparatus 1200 to communicate with another device.

The processor 1210 performs a function performed by a processing unit 910 in the first communication apparatus 900. The communication interface 1220 is configured to perform a function performed by a transceiver unit 920 in the communication apparatus 900.

In response to the communication apparatus 1200 being configured to perform an operation performed by the first communication apparatus, the processor 1210 is configured to obtain first information, where the first information carries indication information of both a first transmission resource and a second transmission resource, where the first transmission resource is for transmitting first data to the second communication apparatus, and the first data is a first output of a first machine learning model; and the second transmission resource is for receiving first feedback data from the second communication apparatus, the first feedback data indicates a first gradient, and the first gradient is for updating the first machine learning model. The communication interface 1220 is configured to transmit the first data to the second communication apparatus on the first transmission resource.

In response to the communication apparatus 1200 being configured to perform an operation performed by the second communication apparatus, the processor 1210 is configured to obtain first information, where the first information carries indication information of both a first transmission resource and a second transmission resource, where the first transmission resource is for receiving second data from the first communication apparatus, the second data is data obtained after first data is transmitted through a channel, and the first data is a first output of the first machine learning model; and the second transmission resource is for transmitting first feedback data to the first communication apparatus, the first feedback data indicates a first gradient, and the first gradient is for updating the first machine learning model. The communication interface 1220 is configured to transmit the first feedback data to the first communication apparatus on the second transmission resource.

In response to the communication apparatus 1200 being configured to perform an operation performed by the third communication apparatus, the processor 1210 is configured to obtain first information, where the first information carries indication information of both a first transmission resource and a second transmission resource, where the first transmission resource is for the first communication apparatus to transmit first data to the second communication apparatus, and the first data is a first output of the first machine learning model; and the second transmission resource is for the second communication apparatus to transmit first feedback data to the first communication apparatus, the first feedback data indicates a first gradient, and the first gradient is for updating the first machine learning model. The communication interface 1220 is configured to transmit the first information to the first communication apparatus and/or the second communication apparatus.

The communication interface 1220 is further configured to perform other receiving or sending steps or operations performed by the first communication apparatus, the second communication apparatus, or the third communication apparatus in the foregoing method embodiment. The processor 1210 is further configured to perform corresponding steps or operations, other than receiving and sending, performed by the first communication apparatus, the second communication apparatus, or the third communication apparatus in the foregoing method embodiment. Details are not described herein again.

The communication apparatus 1200 further includes at least one memory 1230, configured to store program instructions and/or data. The memory 1230 is coupled to the processor 1210. The coupling in at least one embodiment is indirect coupling or a communication connection between apparatuses, units, or modules in an electrical form, a mechanical form, or another form, and is used for information exchange between the apparatuses, the units, or the modules. The processor 1210 cooperates with the memory 1230. The processor 1210 executes the program instructions stored in the memory 1230. In at least one embodiment, at least one of the at least one memory is integrated with the processor. In at least one embodiment, the memory 1230 is located outside the communication apparatus 1200.

In at least one embodiment, a specific connection medium between the communication interface 1220, the processor 1210, and the memory 1230 is not limited. In at least one embodiment, the memory 1230, the processor 1210, and the communication interface 1220 are connected through a bus 1240 in FIG. 12. The bus is represented by using a bold line in FIG. 12. The foregoing is merely an example for description. A connection manner of other components is not limited thereto. The bus is classified into an address bus, a data bus, a control bus, and the like. For ease of representation, only one bold line is used to represent the bus in FIG. 12, but this does not mean that there is only one bus or only one type of bus.

In at least one embodiment, the processor 1210 is one or more central processing units (CPUs). In response to the processor 1210 being one CPU, the CPU is a single-core CPU, or is a multi-core CPU. The processor 1210 is a general-purpose processor, a digital signal processor, an application-specific integrated circuit, a field programmable gate array or another programmable logic device, a discrete gate or transistor logic device, or a discrete hardware component, and implements or execute the methods, steps, and logical block diagrams disclosed in at least one embodiment. The general-purpose processor is a microprocessor or any conventional processor or the like. The steps in the method disclosed with reference to at least one embodiment is directly performed by a hardware processor, or is performed by using a combination of hardware in a processor and a software module.

In at least one embodiment, the memory 1230 includes but is not limited to a nonvolatile memory such as a hard disk drive (HDD) or a solid-state drive (SSD), a random access memory (RAM), an erasable programmable read-only memory (EPROM), a read-only memory (ROM), a compact disc read-only memory (CD-ROM), or the like. The memory is any other medium that is used to carry or store expected program code in a form of an instruction or a data structure and that is accessed by a computer, but is not limited thereto. The memory in at least one embodiment is alternatively a circuit or any other apparatus that implements a storage function, and is configured to store the program instructions and/or the data.

Optionally, in addition to the foregoing structure, the communication apparatus in at least one embodiment alternatively has the following structure.

Figure 13:
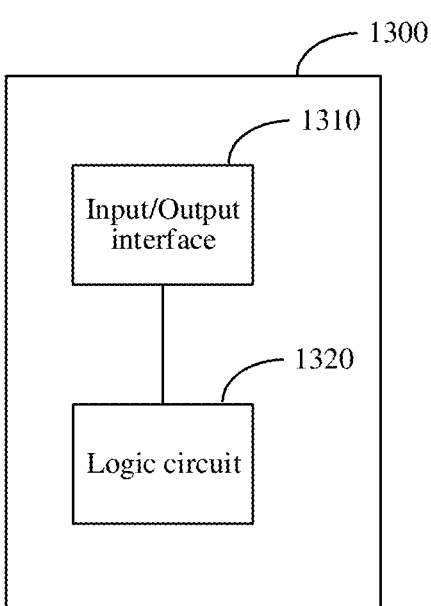
FIG. 13 is a schematic diagram of a structure of an apparatus according to at least one embodiment.

Refer to FIG. 13. An embodiment of this application further provides an apparatus 1300, which is configured to implement functions of the first communication apparatus, the second communication apparatus, or the third communication apparatus in the foregoing method. The apparatus 1300 is a communication apparatus or a chip in the communication apparatus. The communication apparatus includes:

At least one input/output interface 1310 and a logic circuit 1320. The input/output interface 1310 is an input/output circuit, or is referred to as a communication interface. The logic circuit 1320 is a signal processor, a chip, or another integrated circuit that implements the method in at least one embodiment.

The at least one input/output interface 1310 is configured to input or output a signal or data. For example, in response to the apparatus being the first communication apparatus or being used in the first communication apparatus, the input/output interface 1310 is configured to communicate with the second communication apparatus. For example, in response to the apparatus being the second communication apparatus or being used in the second communication apparatus, the input/output interface 1310 is configured to output first feedback data.

The logic circuit 1320 is configured to perform some or all of steps in any method provided in at least one embodiment. The logic circuit implements functions implemented by a processing unit 901 in the first communication apparatus 900, a processing unit 1001 in the second communication apparatus 1000, or a processing unit 1101 in the third communication apparatus 1100. For example, in response to the apparatus being the first communication apparatus or being used in the first communication apparatus, the apparatus is configured to perform steps performed by the first communication apparatus (a transmitting communication apparatus) in the implementations in the foregoing method embodiment. For example, the logic circuit 1320 is configured to obtain a first output. In response to the apparatus being the second communication apparatus or being used in the second communication apparatus, the apparatus is configured to perform steps performed by the second communication apparatus (a receiving communication apparatus) in the implementations in the foregoing method embodiment. For example, the logic circuit 1320 is configured to determine a first gradient.

In response to the communication apparatus being a chip used in the first communication apparatus, the terminal chip implements the functions of the first communication apparatus in the foregoing method embodiment. The terminal chip receives information from another module (for example, a radio frequency module or an antenna) in a terminal, and the information is sent by the second communication apparatus or the third communication apparatus to the first communication apparatus. Alternatively, the terminal chip sends information to another module (for example, a radio frequency module or an antenna) in the second communication apparatus, and the information is sent by the first communication apparatus to the second communication apparatus or the third communication apparatus.

In response to the communication apparatus being a chip used in the second communication apparatus, the chip in the second communication apparatus implements the functions of the second communication apparatus in the foregoing method embodiment. The chip in the second communication apparatus receives information from another module (for example, a radio frequency module or an antenna) in the second communication apparatus, and the information is sent by the first communication apparatus or the third communication apparatus to the second communication apparatus. The chip in the second communication apparatus sends information to another module (for example, a radio frequency module or an antenna) in the second communication apparatus, and the information is sent by the second communication apparatus to the first communication apparatus or the third communication apparatus.

In response to the communication apparatus being a chip used in the third communication apparatus, the chip in the third communication apparatus implements the functions of the third communication apparatus in the foregoing method embodiment. The chip in the third communication apparatus receives information from another module (for example, a radio frequency module or an antenna) in the third communication apparatus, and the information is sent by the first communication apparatus or the second communication apparatus to the third communication apparatus. The chip in the third communication apparatus sends information to another module (for example, a radio frequency module or an antenna) in the third communication apparatus, and the information is sent by the third communication apparatus to the first communication apparatus or the second communication apparatus.

Based on a same concept as the foregoing method embodiments, at least one embodiment further provides a computer-readable storage medium. The computer-readable storage medium stores a computer program. The computer program is executed by hardware (for example, a processor), to implement some or all of steps in any one of the methods performed by any apparatus in at least one embodiment.

Based on a same concept as the foregoing method embodiments, at least one embodiment further provides a computer program product including program instructions. In response to the computer program product running on a computer, the computer is enabled to perform some or all of steps in any one of the methods in the foregoing aspects.

Based on a same concept as the foregoing method, at least one embodiment further provides a chip or a chip system. The chip includes a processor. The chip further includes a memory (or a storage module) and/or a transceiver (or a communication module), or the chip is coupled to the memory (or a storage module) and/or a transceiver (or a communication module). The transceiver (or the communication module) is configured to support the chip in wired and/or wireless communication, and the memory (or the storage module) is configured to store a program. The processor invokes the program to implement an operation performed by the terminal or the network device in any one of the foregoing method embodiments or the implementations of the method embodiments. The chip system includes the chip, or includes the chip and another discrete device, such as a memory (or a storage module) and/or a transceiver (or a communication module).

Based on a same concept as the foregoing method, at least one embodiment further provides a communication system. The communication system includes at least one of the foregoing first communication apparatus, second communication apparatus, and third communication apparatus. The communication system is configured to implement an operation performed by the terminal or the network device in any one of the foregoing method embodiments and the implementations of the method embodiments. For example, the communication system has a structure shown in FIG. 1*a* or FIG. 1B.

In several embodiments provided in at least one embodiment, the disclosed system, apparatus, and method is implemented in another manner. For example, the described apparatus embodiment is merely an example. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented through some interfaces. The indirect couplings or communication connections between the apparatuses or units is implemented in electronic, mechanical, or other forms.

The units described as separate components is or is not physically separate, and components displayed as units is or is not physical units, in other words, is located in one position, or is distributed on a plurality of network units. Some or all of the units is selected based on an actual requirement to achieve the objectives of the solutions of embodiments.

In addition, functional units in at least one embodiment is integrated into one processing unit, or each of the units exist alone physically, or two or more units are integrated into one unit. The integrated unit is implemented in a form of hardware, or is implemented in a form of a software functional unit.

In response to the integrated unit being implemented in the form of the software functional unit and sold or used as an independent product, the integrated unit is stored in a computer-readable storage medium. Based on such an understanding, the technical solutions of at least one embodiment essentially, or the part contributing to the conventional technology, or all or some of the technical solutions is implemented in a form of a software product. The computer software product is stored in a storage medium and includes several instructions for instructing a computer device (which is a personal computer, a server, a network device, or the like) to perform all or some of the steps of the method in at least one embodiment. The foregoing storage medium includes any medium that stores program code, such as a USB flash drive, a removable hard disk, a read-only memory (ROM), a random access memory (RAM), a magnetic disk, or an optical disc.

What is claimed is:

1. A data transmission method comprising:
deploying a first machine learning model in a first communication apparatus of a communication system;
deploying a second machine learning model in a second communication apparatus of the communication system;
implementing communication between the first communication apparatus and the second communication apparatus using the first machine learning model and the second machine learning model;
obtaining, by the first communication apparatus, first information, wherein the first information includes a training unit (TU) indicating a first transmission resource and a second transmission resource, the TU configured to transmit first data to the second communication apparatus and receive first feedback data from the second communication apparatus, wherein the first transmission resource is for the first communication apparatus to send the first data to the second communication apparatus in the TU, and the first data is a first output of the first machine learning model; and the second transmission resource is for the first communication apparatus to receive the first feedback data from the second communication apparatus in the TU, the first feedback data indicates a first gradient, and the first gradient is for updating the first machine learning model; and
sending, by the first communication apparatus, the first data to the second communication apparatus on the first transmission resource.

2. The method according to claim 1, wherein receiving the first gradient by the second communication apparatus includes calculating the first gradient based on a second output, the second output is an output obtained by inputting second data into the second machine learning model, and the second data is data obtained after the first data is transmitted through a channel.

3. The method according to claim 1, wherein the obtaining the first information includes obtaining indication information of a transmission resource unit, and the first transmission resource and the second transmission resource are included in the transmission resource unit.

4. The method according to claim 3, wherein the obtaining the indication information of the transmission resource unit includes obtaining training control information (TCI).

5. The method according to claim 1, wherein the obtaining the first information includes obtaining indication information of a third transmission resource and a fourth transmission resource, wherein the third transmission resource is for the first communication apparatus to send third data to the second communication apparatus, and the third data is a third output of the first machine learning model; and the fourth transmission resource is for the first communication apparatus to receive second feedback data from the second communication apparatus, the second feedback data indicates a second gradient, and the second gradient is for updating the first machine learning model; and the first communication apparatus sending the third data to the second communication apparatus on the third transmission resource.

6. The method according to claim 5, wherein the receiving the second feedback data includes receiving the second gradient by the second communication apparatus through calculation based on a fourth output, the fourth output is an output obtained by inputting fourth data into the second machine learning model, and the fourth data is data obtained after the third data is transmitted through a channel.

7. The method according to claim 5, wherein the obtaining the first transmission resource includes obtaining a forward transmission resource in a first round, and the second transmission resource is a reverse transmission resource in the first round; and the third transmission resource is a forward transmission resource in a second round, and the fourth transmission resource is a reverse transmission resource in the second round.

8. The method according to claim 1, wherein the obtaining the first transmission resource and the second transmission resource includes obtaining the first transmission resource and the second transmission resource at:

fixed transmission resource locations in at least one of time domain, frequency domain, space domain, code domain, or power domain; or resource locations that are in at least one of time domain, frequency domain, space domain, code domain, and power domain and that are for transmitting service data.

9. The method according to claim 1, wherein the obtaining, by the first communication apparatus, the first information includes:

receiving, by the first communication apparatus, the first information from the second communication apparatus; or receiving, by the first communication apparatus, the first information from a third communication apparatus, wherein the third communication apparatus is configured to control the communication between the first communication apparatus and the second communication apparatus.

10. The method according to claim 1, wherein after the obtaining, by the first communication apparatus, the first information, the method further comprises:

sending, by the first communication apparatus, the first information to the second communication apparatus.

11. The method according to claim 1, wherein the method further comprises:

inputting, by the first communication apparatus, training data into the first machine learning model, to obtain the first output; and after the sending, by the first communication apparatus, the first data to the second communication apparatus on the first transmission resource, the method further comprises:

receiving, by the first communication apparatus, the first feedback data from the second communication apparatus on the second transmission resource, wherein the first feedback data indicates the first gradient; and updating, by the first communication apparatus, the first machine learning model based on the first gradient.

12. The method according to claim 1, wherein before the obtaining, by the first communication apparatus, the first information, the method further comprises:

receiving, by the first communication apparatus, a training indication from the second communication apparatus, wherein the training indication indicates to train the first machine learning model.

13. A data transmission method comprising:

deploying a first machine learning model in a first communication apparatus of a communication system;

deploying a second machine learning model in a second communication apparatus of the communication system;

implementing communication between the first communication apparatus and the second communication apparatus using the first machine learning model and the second machine learning model;

obtaining, by the second communication apparatus, first information, wherein the first information includes a training unit (TU) indicating a first transmission resource and a second transmission resource, the TU configured to transmit first data to the second communication apparatus and receive first feedback data from the second communication apparatus, wherein the first transmission resource is for the second communication apparatus to receive second data from the first communication apparatus in the TU, the second data is data obtained after the first data is transmitted through a channel, and the first data is a first output of the first machine learning model; and the second transmission resource is for the second communication apparatus to send the first feedback data to the first communication apparatus in the TU, the first feedback data indicates a first gradient, and the first gradient is for updating the first machine learning model; and sending, by the second communication apparatus, the first feedback data to the first communication apparatus on the second transmission resource.

14. The method according to claim 13, wherein the method further comprises:

inputting, by the second communication apparatus, the second data into the second machine learning model, and obtaining a third gradient through calculation based on a second output, wherein the third gradient is for updating the second machine learning model.

15. The method according to claim 13, wherein the sending the first feedback data including the first gradient by the second communication apparatus includes calculating by the second communication apparatus the first gradient based on a second output, and the second output is an output obtained by inputting the second data into the second machine learning model.

16. The method according to claim 13, wherein the obtaining the first information includes obtaining indication information of a transmission resource unit, and the first transmission resource and the second transmission resource are included in the transmission resource unit.

17. The method according to claim 16, wherein the obtaining the indication information of the transmission resource unit includes obtaining a training control information (TCI).

18. The method according to claim 13, wherein the obtaining the first information includes obtaining indication information of a third transmission resource and a fourth transmission resource, wherein the third transmission resource is for the second communication apparatus to receive fourth data from the first communication apparatus, the fourth data is data obtained after third data is transmitted through the channel, and the third data is a third output of the first machine learning model; and the fourth transmission resource is for the second communication apparatus to send second feedback data to the first communication apparatus, the second feedback data indicates a second gradient, and the second gradient is for updating the first machine learning model; and the second communication apparatus sending the second feedback data to the first communication apparatus on the fourth transmission resource.

19. The method according to claim 18, wherein the sending the second feedback data by the second communication apparatus includes sending by the second communication apparatus the second gradient obtained by the second communication apparatus through calculation based on a fourth output, and the fourth output is an output obtained by inputting the fourth data into the second machine learning model.

20. A data transmission method comprising:

deploying a first machine learning model in a first communication apparatus of a communication system;

deploying a second machine learning model in a second communication apparatus of the communication system;

implementing communication between the first communication apparatus and the second communication apparatus using the first machine learning model and the second machine learning model;

configuring a third communication apparatus to control communication between the first communication apparatus and the second communication apparatus;

obtaining, by the third communication apparatus, first information, wherein the first information includes a training unit (TU) indicating a first transmission resource and a second transmission resource, the TU configured to transmit first data to the second communication apparatus and receive first feedback data from the second communication apparatus, wherein the first transmission resource is for the first communication apparatus to send the first data to the second communication apparatus in the TU, and the first data is a first output of the first machine learning model; and the second transmission resource is for the second communication apparatus to send the first feedback data to the first communication apparatus in the TU, the first feedback data indicates a first gradient, and the first gradient is for updating the first machine learning model; and sending, by the third communication apparatus, the first information to the first communication apparatus and/or the second communication apparatus.

* * * * *